US009801108B2

(12) United States Patent
Wang et al.

(10) Patent No.: US 9,801,108 B2
(45) Date of Patent: Oct. 24, 2017

(54) METHOD FOR HANDOVER WITHOUT DEFAULT BEARER AND DEVICE

(71) Applicant: Huawei Technologies Co., Ltd., Shenzhen (CN)

(72) Inventors: Chunguang Wang, Shanghai (CN); Wanqiang Zhang, Beijing (CN); Yijun Yu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/958,819

(22) Filed: Dec. 3, 2015

(65) Prior Publication Data

US 2016/0088540 A1 Mar. 24, 2016

Related U.S. Application Data

(63) Continuation of application No. PCT/CN2013/076638, filed on Jun. 3, 2013.

(51) Int. Cl.
*H04W 36/00* (2009.01)
*H04W 36/14* (2009.01)
*H04W 36/02* (2009.01)

(52) U.S. Cl.
CPC ....... *H04W 36/14* (2013.01); *H04W 36/0016* (2013.01); *H04W 36/02* (2013.01); *H04W 36/0055* (2013.01)

(58) Field of Classification Search
CPC . H04W 36/14; H04W 36/0016; H04W 36/02; H04W 36/0055

(Continued)

(56) References Cited

U.S. PATENT DOCUMENTS

| 8,442,534 B2 * | 5/2013 | Hapsari | ................. | H04W 99/00 455/436 |
| 2009/0086674 A1 * | 4/2009 | Ejzak | ................ | H04W 36/0016 370/331 |

(Continued)

FOREIGN PATENT DOCUMENTS

| CN | 101541050 A | 2/1991 |
| CN | 101291529 A | 10/2008 |

(Continued)

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-UTRAN) Access (Release 12)," 3GPP TS 23.401, V12.0.0, Mar. 2013, 290 pages.

(Continued)

*Primary Examiner* — Huy C Ho
(74) *Attorney, Agent, or Firm* — Slater Matsil, LLP

(57) ABSTRACT

Embodiments of the present application provide a method for a handover without a default bearer. A first network device sends a relocation request to a second network device. The second network device establishes a connection to a third network device indicated by the relocation request, and sends a response to the first network device and indicates that data is to be sent by using a signaling plane. Then the first network device instructs a source network device to forward the data to a target network device according to a forwarding mode indicated by a handover command. Alternatively, after the second network device establishes the connection to the third network device indicated by the relocation request, the third network device caches data, and after a handover of user equipment is completed, the third network device sends the cached data to the second network device.

20 Claims, 19 Drawing Sheets

(58) Field of Classification Search
USPC .......................................................... 455/436
See application file for complete search history.

(56) References Cited

U.S. PATENT DOCUMENTS

| | | |
|---|---|---|
| 2010/0056147 A1 | 3/2010 | Sun et al. |
| 2012/0282956 A1 | 11/2012 | Kim et al. |
| 2012/0320876 A1 | 12/2012 | Zhou et al. |

FOREIGN PATENT DOCUMENTS

| | | |
|---|---|---|
| CN | 101557610 A | 10/2009 |
| GB | 2493216 A | 1/2013 |
| JP | 2011501481 A | 1/2011 |
| WO | 2010050758 A2 | 5/2010 |
| WO | 2012136374 A2 | 10/2012 |
| WO | 2013006219 A1 | 1/2013 |

OTHER PUBLICATIONS

"NAS Forwarding for Inter-ENB Handover," Agenda Item: 13.3.2a, Source: Samsung, Document for: Discussion and Decision, 3GPP TSG-RAN WG3 Meeting #57, R3-071365, Athens, Greece, Aug. 20-24, 2007, 4 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.2.0, Jun. 2008, pp. 99-110.

* cited by examiner

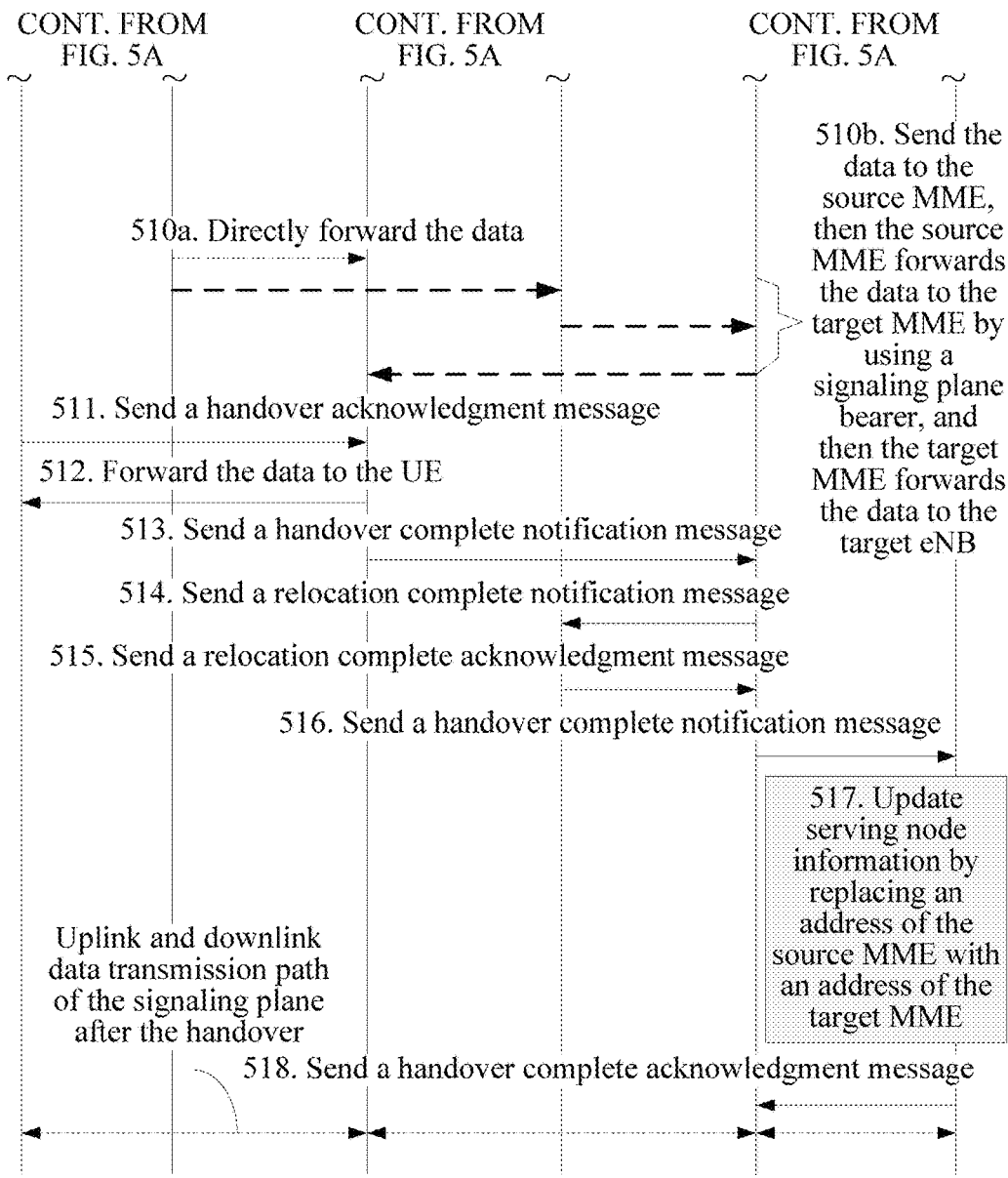

METHOD FOR HANDOVER WITHOUT DEFAULT BEARER AND DEVICE

This application is a continuation of International Application No. PCT/CN2013/076638, filed on Jun. 3, 2013, which is hereby incorporated by reference in the entirety.

TECHNICAL FIELD

The present application relates to the field of communications, and in particular, to a method for a handover without a default bearer and a device.

BACKGROUND

To cope with challenges of a wireless broadband technology and keep a leading advantage of the 3GPP the 3rd Generation Partnership Project) network, the 3GPP formulates an LTE (Long Term Evolution) plan. A new mobile communications network architecture is defined under the guidance of the evolution plan. The architecture retains only a packet domain, and therefore may be referred to as an EPS (evolved packet system).

A core network of the EPS mainly includes three logical functional entities: an MME (mobility management entity), an S-GW (serving gateway), a P-GW (packet data network gateway), and the three functional entities are core network devices of the EPS network. The MME is responsible for functions such as NAS (non-access stratum) signaling processing, security, and mobility management, and corresponds to a control plane part of an SGSN (Serving GPRS Support Node, serving GPRS (general packet radio service) support node) in a current UMTS (universal mobile telecommunications system); the S-GW is responsible for a local mobility anchor and a mobility anchor in the 3GPP system and for lawful interception of related information; and the P-GW is responsible for related functions such as policy enforcement and charging and lawful interception.

In an existing EPC (evolved packet core, where the EPC is a part of the EPS), a default bearer is established when UE initiates attach and is retained all the time when a PDN (packet data network) connection exists, to provide an IP connection for access of the UE (user equipment) to a PDN. However, in some application scenarios, data exchange does not need to be performed by using an IP connection, for example, for some services of MTC (machine type communication), interaction may be performed in a form of an SMS (short message service) or another service. Therefore, for user equipment having some specific service features, temporarily, no default bearer is established during attachment of the user equipment, some services may be completed in a non-IP connection manner. If data transfer needs to be performed by using a user bearer (or referred to as a data bearer), a bearer establishment process is further initiated.

When there is no default bearer, small data may be transferred by using signaling between an MTC-IWF (MTC interworking function) and an SGSN/MME. However, when UE is handed over between cells, in an existing handover process in an EPC, a data packet needs to be forwarded from a source eNB to a target eNB, and if direct forwarding between the eNBs is not supported, the source eNB indirectly forwards the data packet to the target eNB by using a source S-GW and a target S-GW, which requires data bearers to be established between the eNBs and the S-GWs. However, actually, when small data is transmitted in an existing EPC, the small data is transmitted by using signal connections between an MME, an eNB, and UE, and no data bearer exists between the eNB and an S-GW. Therefore, the existing handover process in the EPC is not applicable to a handover process of a network without a default bearer.

SUMMARY

Embodiments of the present application provide a method for a handover without a default bearer and a device, and solve an issue that when there is no default bearer in an evolved packet system, small data is forwarded by using a signal connection when user equipment is handed over between cells.

In order to achieve the objectives, the following technical solutions are used in the embodiments of the present application.

According to a first aspect, a method for a handover without a default bearer is provided, where the method includes: sending, by a first network device, a relocation request to a second network device, where the relocation request includes information about a third network device and a forwarding mode identifier, where the information about the third network device is used for the second network device to establish a connection to the third network device, and the forwarding mode identifier is used for indicating direct forwarding or indirect forwarding; receiving, by the first network device, a relocation response sent by the second network device, where the relocation response carries indication information indicating that data is to be forwarded by using a signaling plane; sending, by the first network device, a handover command to a source network device, so that the source network device forwards the data to a target network device according to a forwarding mode indicated by the forwarding mode identifier carried in the handover command; and sending, by the first network device, a relocation complete message to the second network device, so that the second network device sends a handover complete notification message to the third network device, and the third network device updates serving node information from an address of the first network device to an address of the second network device.

With reference to the first aspect, in a first possible implementation manner, when an executed handover is an internal handover in an evolved universal mobile telecommunications system terrestrial radio access network E-UTRAN or a handover between the E-UTRAN and a universal mobile telecommunications system terrestrial radio access network UTRAN, the sending, by the first network device, a handover command to a source network device, so that the source network device forwards the data to a target network device according to a forwarding mode indicated by the forwarding mode identifier carried in the handover command includes: sending, by the first network device, the handover command to the source network device, where the forwarding mode identifier carried in the handover command instructs the source network device to directly forward the data to the target network device; or sending, by the first network device, the handover command to the source network device, where the forwarding mode identifier carried in the handover command instructs the source network device to indirectly forward the data; receiving, by the first network device, the data sent by the source network device; and forwarding, by the first network device, the data to the second network device by using a signaling plane bearer, so that the second network device sends the data to the target network device.

With reference to the first aspect, in a second possible implementation manner, when an executed handover is a handover between the E-UTRAN and the UTRAN, and a side of a network before the handover has a default bearer and a side of a network after the handover has no default bearer, the sending, by the first network device, a handover command to a source network device, so that the source network device forwards the data to a target network device according to a forwarding mode indicated by the forwarding mode identifier carried in the handover command includes: sending, by the first network device, the handover command to the source network device, where the forwarding mode identifier carried in the handover command instructs the source network device to directly forward the data to the target network device; or sending, by the first network device, the handover command to the source network device, where the forwarding mode identifier carried in the handover command instructs the source network device to indirectly forward the data; receiving, by the first network device, the data sent by the source network device; and forwarding, by the first network device, the data to a serving gateway, so that the serving gateway forwards the data to the second network device by using a signaling plane bearer.

With reference to the second possible implementation manner of the first aspect, in a third possible implementation manner, if the forwarding mode identifier instructs the source network device to indirectly forward the data, after the receiving, by the first network device, a relocation response sent by the second network device, the method further includes: sending, by the first network device, a forwarding channel establishment request to the serving gateway; receiving, by the first network device, a forwarding channel establishment response sent by the serving gateway; and establishing, by the first network device, the signaling plane bearer between the serving gateway and the second network device.

With reference to the first aspect to the third possible implementation manner of the first aspect, in a fourth possible implementation manner, when the executed handover is the internal handover in the E-UTRAN, the first network device is a source mobility management entity, the second network device is a target mobility management entity, the third network device is a machine type communication interworking function MTC-IWF, the source network device is a source base station, and the target network device is a target base station; or when the executed handover is a handover from the E-UTRAN to the UTRAN, the first network device is a source mobility management entity, the second network device is a target serving general packet radio service support node SGSN, the third network device is an MTC-IWF, the source network device is a source base station, and the target network device is a target radio network controller RNC; or when the executed handover is a handover from the UTRAN to the E-UTRAN, the first network device is a source SGSN, the second network device is a target mobility management entity, the third network device is an MTC-IWF, the source network device is a source RNC, and the target network device is a target base station.

With reference to the fourth possible implementation manner of the first aspect, in a fifth possible implementation manner, a method for determining that the executed handover is the handover between the E-UTRAN and the UTRAN includes: receiving, by the first network device, a handover request message of the source base station, where the handover request message includes an identifier of the target network device; and determining, by the first network device according to the identifier of the target network device, that the executed handover is the handover between the E-UTRAN and the UTRAN.

According to a second aspect, a method for a handover without a default bearer is provided, where the method includes: receiving, by a second network device, a relocation request sent by a first network device, where the relocation request includes information about a third network device and a forwarding mode identifier, where the information about the third network device is used for the second network device to establish a connection to the third network device, and the forwarding mode identifier is used for indicating direct forwarding or indirect forwarding; sending, by the second network device, a relocation response to the first network device, where the relocation response carries indication information indicating that data is to be forwarded by using a signaling plane, so that after the first network device receives the relocation response, the first network device sends a handover command to a source network device, and the source network device forwards the data to a target network device according to a forwarding mode indicated by the forwarding mode identifier carried in the handover command; and sending, by the second network device, a handover complete notification message to the third network device, so that the third network device updates serving node information from an address of the first network device to an address of the second network device.

With reference to the second aspect, in a first possible implementation manner, when an executed handover is an internal handover in an E-UTRAN, the first network device is a source mobility management entity, the second network device is a target mobility management entity, the third network device is a machine type communication interworking function MTC-IWF, the source network device is a source base station, and the target network device is a target base station; or when an executed handover is a handover from the E-UTRAN to a UTRAN, the first network device is a source mobility management entity, the second network device is a target serving general packet radio service support node SGSN, the third network device is an MTC-IWF, the source network device is a source base station, and the target network device is a target radio network controller RNC; or when an executed handover is a handover from the UTRAN to the E-UTRAN, the first network device is a source SGSN, the second network device is a target mobility management entity, the third network device is an MTC-IWF, the source network device is a source RNC, and the target network device is a target base station.

According to a third aspect, a method for a handover without a default bearer is provided, where the method includes: sending, by a first network device, a relocation request to a second network device, where the relocation request includes information about a third network device, where the information about the third network device is used for the second network device to establish a connection to the third network device; after the second network device establishes the connection to the third network device, and the second network device instructs the third network device to cache data, receiving, by the first network device, a relocation response sent by the second network device, where the relocation response carries indication information indicating that the data is to be forwarded by using a signaling plane; and sending, by the first network device, a handover command to a source network device, so that the source network device triggers a handover of user equipment according to the handover command, and after the handover of the user equipment is completed, the second network device receives the data sent by the third network device.

With reference to the third aspect, in a first possible implementation manner, when an executed handover is an internal handover in an E-UTRAN, the first network device is a source mobility management entity, the second network device is a target mobility management entity, the third network device is a machine type communication interworking function MTC-IWF, the source network device is a source base station, and a target network device is a target base station; or when an executed handover is a handover from the E-UTRAN to a UTRAN, the first network device is a source mobility management entity, the second network device is a target serving general packet radio service support node SGSN, the third network device is an MTC-IWF, the source network device is a source base station, and a target network device is a target radio network controller RNC; or when an executed handover is a handover from the UTRAN to the E-UTRAN, the first network device is a source SGSN, the second network device is a target mobility management entity, the third network device is an MTC-IWF, the source network device is a source RNC, and a target network device is a target base station.

According to a fourth aspect, a method for a handover without a default bearer is provided, where the method includes: receiving, by a second network device, a relocation request sent by a first network device, where the relocation request includes information about a third network device, where the information about the third network device is used for the second network device to establish a connection to the third network device; establishing, by the second network device, the connection to the third network device, and indicating to the third network device that a handover process of user equipment starts, so that the third network device caches data; sending, by the second network device, a relocation response to the first network device, where the relocation response carries indication information indicating that the data is to be forwarded by using a signaling plane; and receiving, by the second network device, the data sent by the third network device.

With reference to the fourth aspect, in a first possible implementation manner, before the receiving, by the second network device, the data sent by the third network device, the method further includes: sending, by the second network device, a handover complete notification to the third network device, so that the third network device updates serving node information from an address of the first network device to an address of the second network device.

With reference to the fourth aspect or the first possible implementation manner of the fourth aspect, in a second possible implementation manner, when an executed handover is an internal handover in an E-UTRAN, the first network device is a source mobility management entity, the second network device is a target mobility management entity, the third network device is a machine type communication interworking function MTC-IWF, a source network device is a source base station, and a target network device is a target base station; or when an executed handover is a handover from the E-UTRAN to a UTRAN, the first network device is a source mobility management entity, the second network device is a target serving general packet radio service support node SGSN, the third network device is an MTC-IWF, a source network device is a source base station, and a target network device is a target radio network controller RNC; or when an executed handover is a handover from the UTRAN to the E-UTRAN, the first network device is a source SGSN, the second network device is a target mobility management entity, the third network device is an MTC-IWF, a source network device is a source RNC, and a target network device is a target base station.

According to a fifth aspect, a network device is provided, where the network device includes: a sending unit, configured to send a relocation request to a second network device, where the relocation request includes information about a third network device and a forwarding mode identifier, where the information about the third network device is used for the second network device to establish a connection to the third network device, and the forwarding mode identifier is used for indicating direct forwarding or indirect forwarding; a receiving unit, configured to receive a relocation response sent by the second network device, where the relocation response carries indication information indicating that data is to be forwarded by using a signaling plane; a handover unit, configured to send a handover command to a source network device, so that the source network device forwards the data to a target network device according to a forwarding mode indicated by the forwarding mode identifier carried in the handover command; and a notification unit, configured to send a relocation complete message to the second network device, so that the second network device sends a handover complete notification message to the third network device, and the third network device updates serving node information from an address of the network device to an address of the second network device.

With reference to the fifth aspect, in a first possible implementation manner, when an executed handover is an internal handover in an E-UTRAN or a handover between an E-UTRAN and a UTRAN: the handover unit is specifically configured to send the handover command to the source network device, where the forwarding mode identifier carried in the handover command instructs the source network device to directly forward the data to the target network device; or the handover unit is specifically configured to send the handover command to the source network device, where the forwarding mode identifier carried in the handover command instructs the source network device to indirectly forward the data; the receiving unit is further configured to receive the data sent by the source network device; and the sending unit is further configured to forward the data to the second network device by using a signaling plane bearer, so that the second network device sends the data to the target network device.

With reference to the fifth aspect, in a second possible implementation manner, when an executed handover is a handover between the E-UTRAN and the UTRAN, and a side of a network before the handover has a default bearer and a side of a network after the handover has no default bearer: the handover unit is specifically configured to send the handover command to the source network device, where the forwarding mode identifier carried in the handover command instructs the source network device to directly forward the data to the target network device; or the handover unit is specifically configured to send the handover command to the source network device, where the forwarding mode identifier carried in the handover command instructs the source network device to indirectly forward the data; the receiving unit is further configured to receive the data sent by the source network device; and the sending unit is further configured to forward the data to a serving gateway, so that the serving gateway forwards the data to the second network device by using a signaling plane bearer.

With reference to the second possible implementation manner of the fifth aspect, in a third possible implementation manner, if the forwarding mode identifier instructs the source network device to indirectly forward the data, after the relocation response sent by the second network device is received: the sending unit is further configured to send a forwarding channel establishment request to the serving gateway; the receiving unit is further configured to receive a forwarding channel establishment response sent by the serving gateway; and the network device further includes: a connection establishment unit, configured to establish the signaling plane bearer between the serving gateway and the second network device.

With reference to any one of the fifth aspect to the third possible implementation manner of the fifth aspect, in a fourth possible implementation manner, when the executed handover is the internal handover in the E-UTRAN, the network device is a source mobility management entity, the second network device is a target mobility management entity, the third network device is a machine type communication interworking function MTC-IWF, the source network device is a source base station, and the target network device is a target base station; or when the executed handover is a handover from the E-UTRAN to the UTRAN, the network device is a source mobility management entity, the second network device is a target serving general packet radio service support node SGSN, the third network device is an MTC-IWF, the source network device is a source base station, and the target network device is a target radio network controller RNC; or when the executed handover is a handover from the UTRAN to the E-UTRAN, the network device is a source SGSN, the second network device is a target mobility management entity, the third network device is an MTC-IWF, the source network device is a source RNC, and the target network device is a target base station.

With reference to the fourth possible implementation manner of the fifth aspect, in a fifth possible implementation manner, the receiving unit is further configured to receive a handover request message of the source network device, where the handover request message includes an identifier of the target network device; and the network device further includes: a forwarding mode determining unit, configured to determine, according to the identifier of the target network device, that the executed handover is the handover between the E-UTRAN and the UTRAN.

According to a sixth aspect, a network device is provided, where the network device includes: a receiving unit, configured to receive a relocation request sent by a first network device, where the relocation request includes information about a third network device and a forwarding mode identifier, where the information about the third network device is used for the network device to establish a connection to the third network device, and the forwarding mode identifier is used for indicating direct forwarding or indirect forwarding; a sending unit, configured to send a relocation response to the first network device, where the relocation response carries indication information indicating that data is to be forwarded by using a signaling plane, so that after the first network device receives the relocation response, the first network device sends a handover command to a source network device, and the source network device forwards the data to a target network device according to a forwarding mode indicated by the forwarding mode identifier carried in the handover command; and a notification unit, configured to send a handover complete notification message to the third network device, so that the third network device updates serving node information from an address of the first network device to an address of the network device.

With reference to the sixth aspect, in a first possible implementation manner, when an executed handover is an internal handover in an E-UTRAN, the first network device is a source mobility management entity, the network device is a target mobility management entity, the third network device is a machine type communication interworking function MTC-IWF, the source network device is a source base station, and the target network device is a target base station; or when an executed handover is a handover from the E-UTRAN to a UTRAN, the first network device is a source mobility management entity, the network device is a target serving general packet radio service support node SGSN, the third network device is an MTC-IWF, the source network device is a source base station, and the target network device is a target radio network controller RNC; or when an executed handover is a handover from the UTRAN to the E-UTRAN, the first network device is a source SGSN, the network device is a target mobility management entity, the third network device is an MTC-IWF, the source network device is a source RNC, and the target network device is a target base station.

According to a seventh aspect, a network device is provided, where the network device includes: a sending unit, configured to send a relocation request to a second network device, where the relocation request includes information about a third network device, where the information about the third network device is used for the second network device to establish a connection to the third network device; a receiving unit, configured to: after the second network device establishes the connection to the third network device, and the second network device instructs the third network device to cache data, receive a relocation response sent by the second network device, where the relocation response carries indication information indicating that the data is to be forwarded by using a signaling plane; and a handover unit, configured to send a handover command to a source network device, so that the source network device triggers a handover of user equipment according to the handover command, and after the handover of the user equipment is completed, the second network device receives the data sent by the third network device.

With reference to the seventh aspect, in a first possible implementation manner, when an executed handover is an internal handover in an E-UTRAN, the network device is a source mobility management entity, the second network device is a target mobility management entity, the third network device is a machine type communication interworking function MTC-IWF, the source network device is a source base station, and a target network device is a target base station; or when an executed handover is a handover from the E-UTRAN to a UTRAN, the network device is a source mobility management entity, the second network device is a target serving general packet radio service support node SGSN, the third network device is an MTC-IWF, the source network device is a source base station, and a target network device is a target radio network controller RNC; or when an executed handover is a handover from the UTRAN to the E-UTRAN, the network device is a source SGSN, the second network device is a target mobility management entity, the third network device is an MTC-IWF, the source network device is a source RNC, and a target network device is a target base station.

According to an eighth aspect, a network device is provided, where the network device includes: a receiving unit, configured to receive a relocation request sent by a first network device, where the relocation request includes information about a third network device, where the information about the third network device is used for the network device to establish a connection to the third network device; a connection establishment unit, configured to establish the connection to the third network device, and indicate to the third network device that a handover process of user equipment starts, so that the third network device caches data; and a sending unit, configured to send a relocation response to the first network device, where the relocation response carries indication information indicating that the data is to be forwarded by using a signaling plane, where the receiving unit is further configured to receive the data sent by the third network device.

With reference to the eighth aspect, in a first possible implementation manner, the network device further includes: a notification unit, configured to: before the data sent by the third network device is received, send a handover complete notification to the third network device, so that the third network device updates serving node information from an address of the first network device to an address of the network device.

With reference to the eighth aspect or the first possible implementation manner of the eighth aspect, in a second possible implementation manner, when an executed handover is an internal handover in an E-UTRAN, the first network device is a source mobility management entity, the network device is a target mobility management entity, the third network device is a machine type communication interworking function MTC-IWF, a source network device is a source base station, and a target network device is a target base station; or when an executed handover is a handover from the E-UTRAN to a UTRAN, the first network device is a source mobility management entity, the network device is a target serving general packet radio service support node SGSN, the third network device is an MTC-IWF, a source network device is a source base station, and a target network device is a target radio network controller RNC; or when an executed handover is a handover from the UTRAN to the E-UTRAN, the first network device is a source SGSN, the network device is a target mobility management entity, the third network device is an MTC-IWF, a source network device is a source RNC, and a target network device is a target base station.

According to a ninth aspect, a network device is provided, where the network device includes: a communications interface, a memory, and a processor, where the communications interface is configured to communicate with a network element, the memory is configured to store computer code, and the processor executes the computer code to: send a relocation request to a second network device, where the relocation request includes information about a third network device and a forwarding mode identifier, where the information about the third network device is used for the second network device to establish a connection to the third network device, and the forwarding mode identifier is used for indicating direct forwarding or indirect forwarding; receive a relocation response sent by the second network device, where the relocation response carries indication information indicating that data is to be forwarded by using a signaling plane; send a handover command to a source network device, so that the source network device forwards the data to a target network device according to a forwarding mode indicated by the forwarding mode identifier carried in the handover command; and send a relocation complete message to the second network device, so that the second network device sends a handover complete notification message to the third network device, and the third network device updates serving node information from an address of the network device to an address of the second network device.

With reference to the ninth aspect, in a first possible implementation manner, when an executed handover is an internal handover in an evolved universal mobile telecommunications system terrestrial radio access network E-UTRAN or a handover between the E-UTRAN and a universal mobile telecommunications system terrestrial radio access network UTRAN, the processor executes the computer code to: send the handover command to the source network device, where the forwarding mode identifier carried in the handover command instructs the source network device to directly forward the data to the target network device; or send the handover command to the source network device, where the forwarding mode identifier carried in the handover command instructs the source network device to indirectly forward the data; receive the data sent by the source network device; and forward the data to the second network device by using a signaling plane bearer, so that the second network device sends the data to the target network device.

With reference to the ninth aspect, in a second possible implementation manner, when an executed handover is a handover between the E-UTRAN and the UTRAN, and a side of a network before the handover has a default bearer and a side of a network after the handover has no default bearer, the processor executes the computer code to: send the handover command to the source network device, where the forwarding mode identifier carried in the handover command instructs the source network device to directly forward the data to the target network device; or send the handover command to the source network device, where the forwarding mode identifier carried in the handover command instructs the source network device to indirectly forward the data; receive the data sent by the source network device; and forward the data to a serving gateway, so that the serving gateway forwards the data to the second network device by using a signaling plane bearer.

With reference to the second possible implementation manner of the ninth aspect, in a third possible implementation manner, if the forwarding mode identifier instructs the source network device to indirectly forward the data, the processor executes the computer code to: after the relocation response sent by the second network device is received, send a forwarding channel establishment request to the serving gateway; receive a forwarding channel establishment response sent by the serving gateway; and establish the signaling plane bearer between the serving gateway and the second network device.

With reference to any one of the ninth aspect to the third possible implementation manner of the ninth aspect, in a fourth possible implementation manner, when the executed handover is the internal handover in the E-UTRAN, the network device is a source mobility management entity, the second network device is a target mobility management entity, the third network device is a machine type communication interworking function MTC-IWF, the source network device is a source base station, and the target network device is a target base station; or when the executed handover is a handover from the E-UTRAN to the UTRAN, the network device is a source mobility management entity, the second network device is a target serving general packet radio service support node SGSN, the third network device is an MTC-IWF, the source network device is a source base station, and the target network device is a target radio network controller RNC; or when the executed handover is a handover from the UTRAN to the E-UTRAN, the network device is a source SGSN, the second network device is a target mobility management entity, the third network device is an MTC-IWF, the source network device is a source RNC, and the target network device is a target base station.

With reference to the fourth possible implementation manner of the ninth aspect, in a fifth possible implementation manner, the processor executes the computer code to further: receive a handover request message of the source network device, where the handover request message includes an identifier of the target network device; and determine, according to the identifier of the target network device, that the executed handover is the handover between the E-UTRAN and the UTRAN.

According to a tenth aspect, a network device is provided, where the network device includes: a communications interface, a memory, and a processor, where the communications interface is configured to communicate with a network element, the memory is configured to store computer code, and the processor executes the computer code to: receive a relocation request sent by a first network device, where the relocation request includes information about a third network device and a forwarding mode identifier, where the information about the third network device is used for the network device to establish a connection to the third network device, and the forwarding mode identifier is used for indicating direct forwarding or indirect forwarding; send a relocation response to the first network device, where the relocation response carries indication information indicating that data is to be forwarded by using a signaling plane, so that after the first network device receives the relocation response, the first network device sends a handover command to a source network device, and the source network device forwards the data to a target network device according to a forwarding mode indicated by the forwarding mode identifier carried in the handover command; and send a handover complete notification message to the third network device, so that the third network device updates serving node information from an address of the first network device to an address of the network device.

With reference to the tenth aspect, in a first possible implementation manner, when an executed handover is an internal handover in an E-UTRAN, the first network device is a source mobility management entity, the network device is a target mobility management entity, the third network device is a machine type communication interworking function MTC-IWF, the source network device is a source base station, and the target network device is a target base station; or when an executed handover is a handover from the E-UTRAN to a UTRAN, the first network device is a source mobility management entity, the network device is a target serving general packet radio service support node SGSN, the third network device is an MTC-IWF, the source network device is a source base station, and the target network device is a target radio network controller RNC; or when an executed handover is a handover from the UTRAN to the E-UTRAN, the first network device is a source SGSN, the network device is a target mobility management entity, the third network device is an MTC-IWF, the source network device is a source RNC, and the target network device is a target base station.

According to an eleventh aspect, a network device is provided, where the network device includes: a communications interface, a memory, and a processor, where the communications interface is configured to communicate with a network element, the memory is configured to store computer code, and the processor executes the computer code to: send a relocation request to a second network device, where the relocation request includes information about a third network device, where the information about the third network device is used for the second network device to establish a connection to the third network device; after the second network device establishes the connection to the third network device, and the second network device instructs the third network device to cache data, receive a relocation response sent by the second network device, where the relocation response carries indication information indicating that the data is to be forwarded by using a signaling plane; and send a handover command to a source network device, so that the source network device triggers a handover of user equipment according to the handover command, and after the handover of the user equipment is completed, the second network device receives the data sent by the third network device.

With reference to the eleventh aspect, in a first possible implementation manner, when an executed handover is an internal handover in an E-UTRAN, the network device is a source mobility management entity, the second network device is a target mobility management entity, the third network device is a machine type communication interworking function MTC-IWF, the source network device is a source base station, and a target network device is a target base station; or when an executed handover is a handover from the E-UTRAN to a UTRAN, the network device is a source mobility management entity, the second network device is a target serving general packet radio service support node SGSN, the third network device is an MTC-IWF, the source network device is a source base station, and a target network device is a target radio network controller RNC; or when an executed handover is a handover from the UTRAN to the E-UTRAN, the network device is a source SGSN, the second network device is a target mobility management entity, the third network device is an MTC-IWF, the source network device is a source RNC, and a target network device is a target base station.

According to a twelfth aspect, a network device is provided, where the network device includes: a communications interface, a memory, and a processor, where the communications interface is configured to communicate with a network element, the memory is configured to store computer code, and the processor executes the computer code to: receive a relocation request sent by a first network device, where the relocation request includes information about a third network device, where the information about the third network device is used for the network device to establish a connection to the third network device; establish the connection to the third network device, and indicate to the third network device that a handover process of user equipment starts, so that the third network device caches data; send a relocation response to the first network device, where the relocation response carries indication information indicating that the data is to be forwarded by using a signaling plane; and receive the data sent by the third network device.

With reference to the twelfth aspect, in a first possible implementation manner, the processor executes the computer code to further: before the data sent by the third network device is received, send a handover complete notification to the third network device, so that the third network device updates serving node information from an address of the first network device to an address of the network device.

With reference to the twelfth aspect or the first possible implementation manner of the twelfth aspect, in a second possible implementation manner, when an executed handover is an internal handover in an E-UTRAN, the network device is a source mobility management entity, the second network device is a target mobility management entity, the third network device is a machine type communication interworking function MTC-IWF, a source network device is a source base station, and a target network device is a target base station; or when an executed handover is a handover from the E-UTRAN to a UTRAN, the network device is a source mobility management entity, the second network device is a target serving general packet radio service support node SGSN, the third network device is an MTC-IWF, a source network device is a source base station, and a target network device is a target radio network controller RNC; or when an executed handover is a handover from the UTRAN to the E-UTRAN, the network device is a source SGSN, the second network device is a target mobility management entity, the third network device is an MTC-IWF, a source network device is a source RNC, and a target network device is a target base station.

The embodiments of the present application provide a method for a handover without a default bearer and a device. After user equipment triggers a handover process, a first network device sends a relocation request to a second network device, then the second network device establishes a connection to a third network device indicated by the relocation request, then the second network device returns a relocation response to the first network device, to indicate that data is to be forwarded by using a signaling plane, and then the first network device sends a handover command to a source network device, so that the source network device forwards the data to a target network device according to a forwarding mode indicated by a forwarding mode identifier carried in the handover command, and after a handover of the user equipment is completed, the user equipment receives the data forwarded by the target network device; or after the second network device establishes the connection to the third network device indicated by the relocation request, the third network device caches data, and after a handover of the user equipment is completed, the second network device receives the data forwarded by a target network device and forwards the data to the user equipment. This solves an issue that when there is no default bearer in an evolved packet system, small data is forwarded by using a signal connection when user equipment is handed over between cells.

BRIEF DESCRIPTION OF THE DRAWINGS

To describe the technical solutions in the embodiments of the present application more clearly, the following briefly introduces the accompanying drawings required for describing the embodiments or the prior art. The accompanying drawings in the following description show merely some embodiments of the present application, and a person of ordinary skill in the art may still derive other drawings from these accompanying drawings without creative efforts.

FIG. 5A and FIG. 5B are a schematic flowchart of interaction of a method for a handover without a default bearer according to an embodiment of the present application;

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
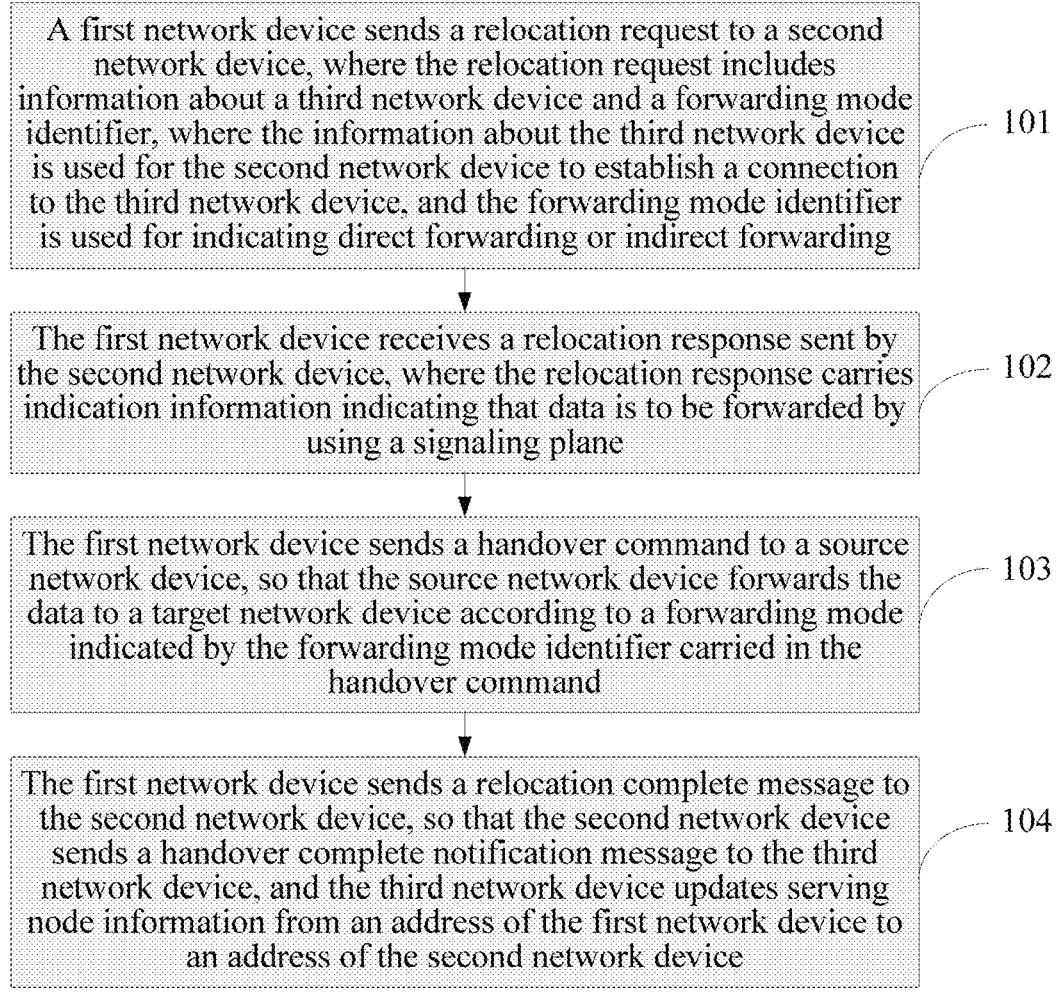
FIG. 1 is a schematic flowchart of a method for a handover without a default bearer according to an embodiment of the present application.

An embodiment of the present application provides a method for a handover without a default bearer, where the default bearer refers to a data plane bearer that is established when user equipment initiates attach and is retained all the time when a PDN connection exists, to provide an IP connection for access of the user equipment to a PDN. In addition, in this embodiment of the present application, data sent by a source network device to a target network device generally refers to small data, for example, the data may be data less than 1000 bytes. As shown in FIG. 1, on a side of a first device, the method includes the following steps.

101: A first network device sends a relocation request to a second network device, where the relocation request includes information about a third network device and a forwarding mode identifier, where the information about the third network device is used for the second network device to establish a connection to the third network device, and the forwarding mode identifier is used for indicating direct forwarding or indirect forwarding.

102: The first network device receives a relocation response sent by the second network device, where the relocation response carries indication information indicating that data is to be forwarded by using a signaling plane.

103: The first network device sends a handover command to a source network device, so that the source network device forwards the data to a target network device according to a forwarding mode indicated by the forwarding mode identifier carried in the handover command.

104: The first network device sends a relocation complete message to the second network device, so that the second network device sends a handover complete notification message to the third network device, and the third network device updates serving node information from an address of the first network device to an address of the second network device.

Figure 2:
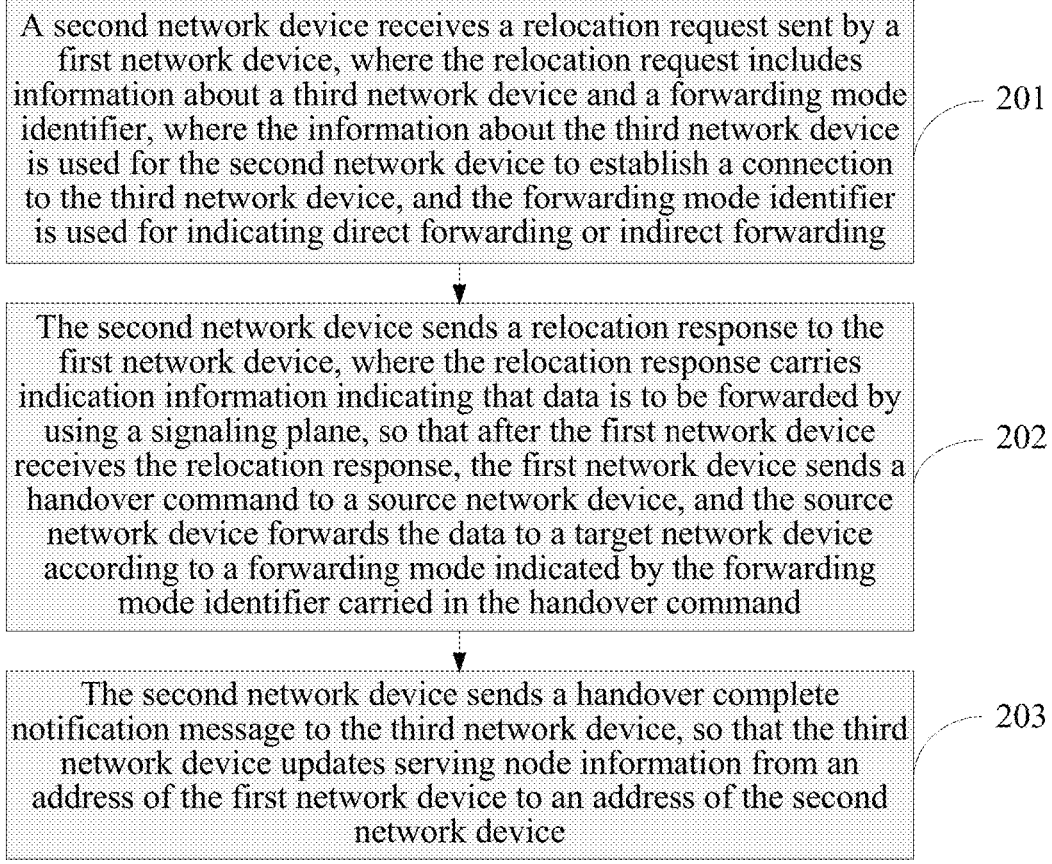
FIG. 2 is a schematic flowchart of a method for a handover without a default bearer according to an embodiment of the present application.

As shown in FIG. 2, an embodiment of the present application provides another method for a handover without a default bearer. On a side of a second device, the method includes the following steps.

201: A second network device receives a relocation request sent by a first network device, where the relocation request includes information about a third network device and a forwarding mode identifier, where the information about the third network device is used for the second network device to establish a connection to the third network device, and the forwarding mode identifier is used for indicating direct forwarding or indirect forwarding.

202: The second network device sends a relocation response to the first network device, where the relocation response carries indication information indicating that data is to be forwarded by using a signaling plane, so that after the first network device receives the relocation response, the first network device sends a handover command to a source network device, and the source network device forwards the data to a target network device according to a forwarding mode indicated by the forwarding mode identifier carried in the handover command.

203: The second network device sends a handover complete notification message to the third network device, so that the third network device updates serving node information from an address of the first network device to an address of the second network device.

Figure 3:
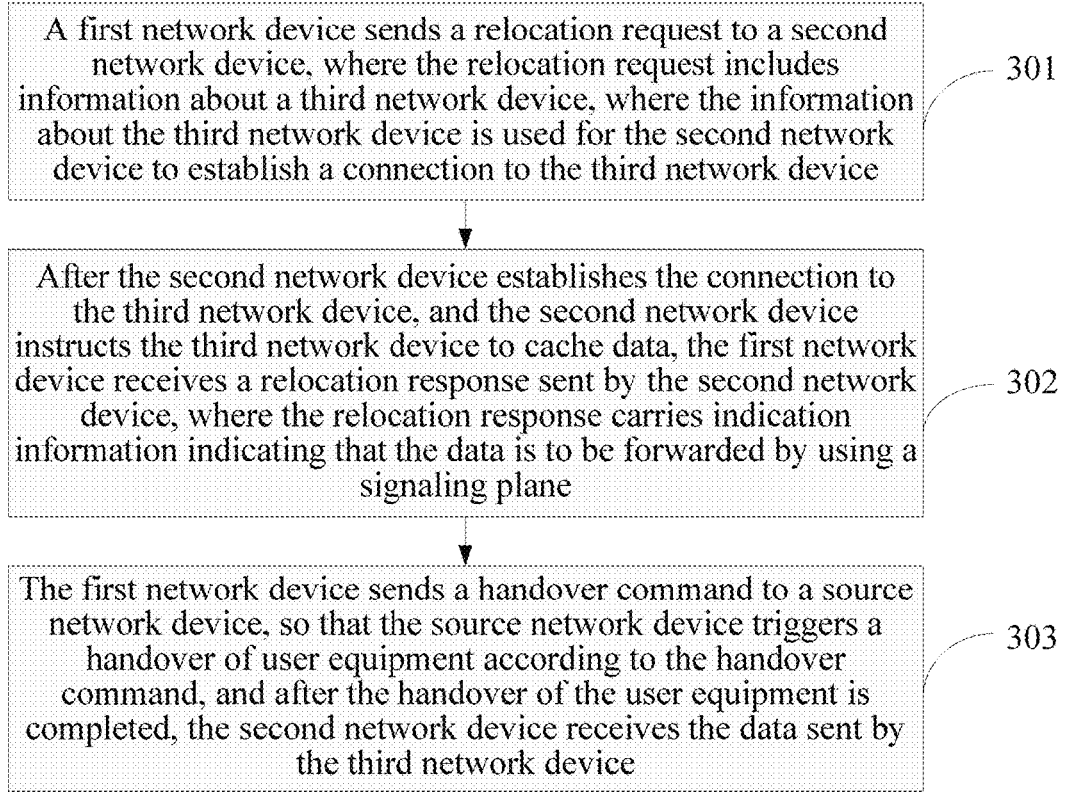
FIG. 3 is a schematic flowchart of a method for a handover without a default bearer according to an embodiment of the present application.

Alternatively, in another implementation manner, an embodiment of the present application further provides a method for a handover without a default bearer. As shown in FIG. 3, on a side of a first device, method includes the following steps.

301: A first network device sends a relocation request to a second network device, where the relocation request includes information about a third network device, where the information about the third network device is used for the second network device to establish a connection to the third network device.

302: After the second network device establishes the connection to the third network device, and the second network device instructs the third network device to cache data, the first network device receives a relocation response sent by the second network device, where the relocation response carries indication information indicating that the data is to be forwarded by using a signaling plane.

303: The first network device sends a handover command to a source network device, so that the source network device triggers a handover of user equipment according to the handover command, and after the handover of the user equipment is completed, the second network device receives the data sent by the third network device.

Figure 4:
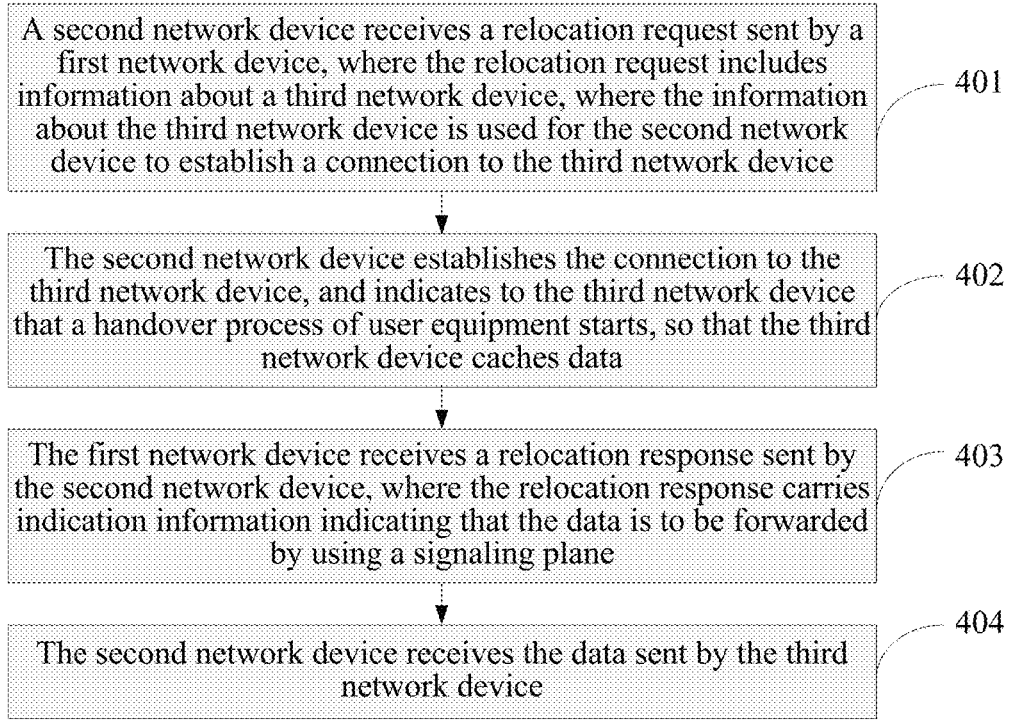
FIG. 4 is a schematic flowchart of a method for a handover without a default bearer according to an embodiment of the present application.

As shown in FIG. 4, an embodiment of the present application provides another method for a handover without a default bearer. On a side of a second device, the method includes the following steps.

401: A second network device receives a relocation request sent by a first network device, where the relocation request includes information about a third network device, where the information about the third network device is used for the second network device to establish a connection to the third network device.

402: The second network device establishes the connection to the third network device, and indicates to the third network device that a handover process of user equipment starts, so that the third network device caches data.

403: The first network device receives a relocation response sent by the second network device, where the relocation response carries indication information indicating that the data is to be forwarded by using a signaling plane.

404: The second network device receives the data sent by the third network device.

When an executed handover is an internal handover in an E-UTRAN (Evolved UMTS Terrestrial Radio Access Network), the first network device is a source MME (Mobility Management Entity), the second network device is a target MME, the third network device is an MTC-IWF (Machine Type Communication Interworking Function), the source network device is a source base station, and the target network device is a target base station; or when an executed handover is a handover from an E-UTRAN to a UTRAN (UMTS Terrestrial Radio Access Network, universal mobile telecommunications system terrestrial radio access network), the first network device is a source MME, the second network device is a target SGSN (Service GPRS Supporting Node, serving general packet radio service support node), the third network device is an MTC-IWF, the source network device is a source base station, and the target network device is an RNC (Radio Network Controller, target radio network controller); or when an executed handover is a handover from a UTRAN to an E-UTRAN, the first network device is a source SGSN, the second network device is a target MME, the third network device is an MTC-IWF, the source network device is a source RNC, and the target network device is a target base station. The base stations may be eNBs (Evolved Node Bs, evolved base stations).

An inter-system handover between an E-UTRAN and a UTRAN is determined by the first network device according to an identifier of the target network device in a received handover request message of the source network device. For example, during the handover from the E-UTRAN to the UTRAN, the source MME determines, according to an identifier of the target RNC in a received handover request message sent by the source eNB, that the current handover is the handover from the E-UTRAN to the UTRAN.

The embodiments of the present application provide a method for a handover without a default bearer. After user equipment triggers a handover process, a first network device sends a relocation request to a second network device, then the second network device establishes a connection to a third network device indicated by the relocation request, then the second network device returns a relocation response to the first network device, to indicate that data is to be forwarded by using a signaling plane, and then the first network device sends a handover command to a source network device, so that the source network device forwards the data to a target network device according to a forwarding mode indicated by a forwarding mode identifier carried in the handover command, and after a handover of the user equipment is completed, the user equipment receives the data forwarded by the target network device; or after the second network device establishes the connection to the third network device indicated by the relocation request, the third network device caches data, and after a handover of the user equipment is completed, the second network device receives the data forwarded by a target network device and forwards the data to the user equipment. This solves an issue that when there is no default bearer in an evolved packet system, small data is forwarded by using a signal connection when user equipment is handed over between cells.

Figure 5A:
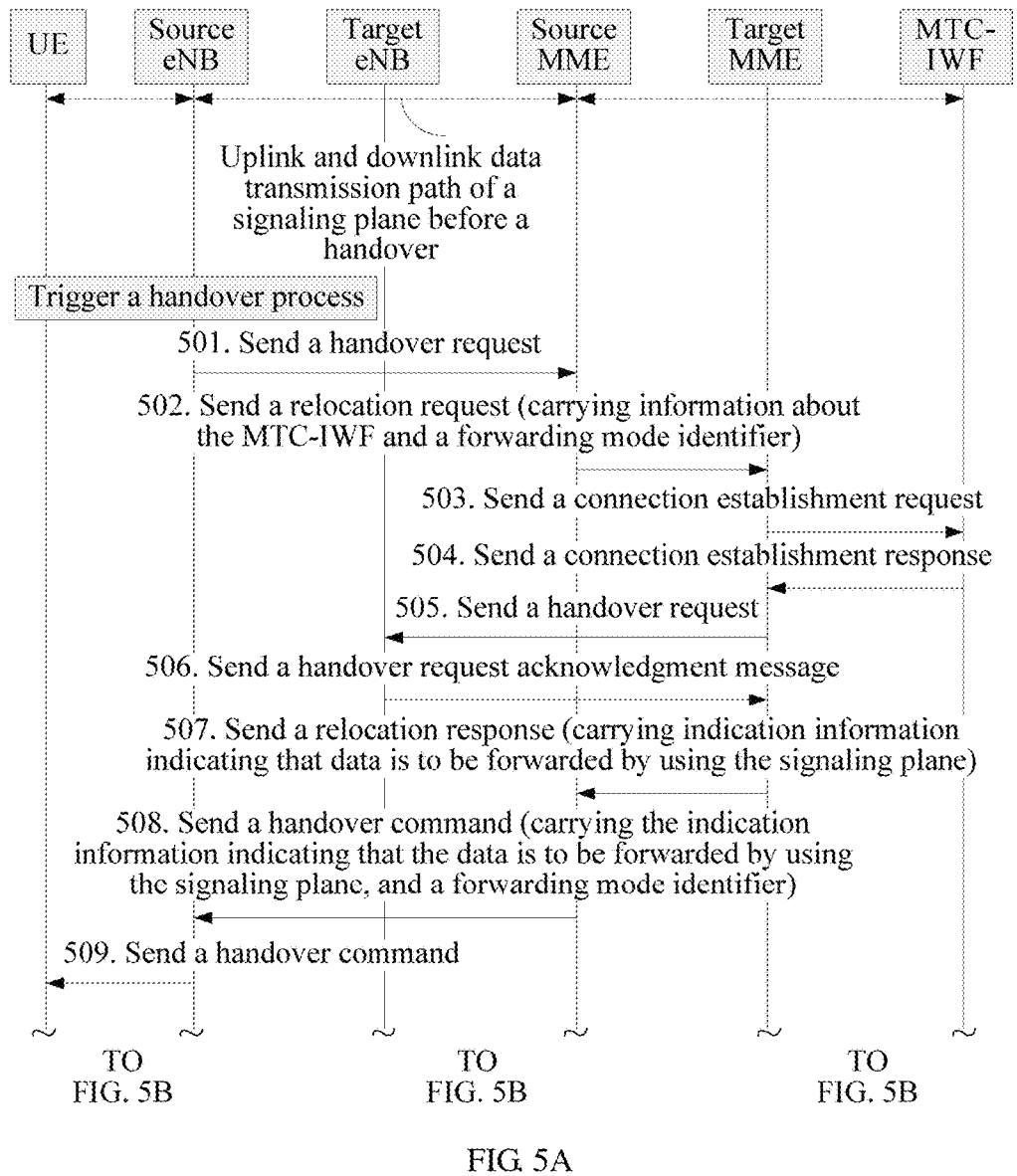

To make a person skilled in the art understand the technical solutions provided in the embodiments of the present application more clearly, a method for a handover without a default bearer provided in an embodiment of the present application is described below in detail by using a specific embodiment. In this embodiment, a handover in an E-UTRAN is used as an example. Therefore, in this embodiment, a first network device is a source MME, a second network device is a target MME, a third network device is an MTC-IWF, a source network device is a source eNB, and a target network device is a target eNB. In addition, for ease of description, user equipment is referred to as UE (User Equipment) for short. As shown in FIG. 5A and FIG. 5B, the method includes the following steps.

501: After a handover process is triggered, a source eNB sends a handover request to a source MME. Before a handover, an uplink and downlink data transmission path of a signaling plane is MTC-IWF-source MME-source eNB-UE, and data is carried by using NAS (Non-access Stratum, non-access stratum) signaling.

502: The source MME selects a target MME, and sends a relocation request to the target MME, where the relocation request carries information about the MTC-IWF and a forwarding mode identifier. The information about the MTC-IWF may be an address of the MTC-IWF, and is used for the target MME to establish a connection to the MTC-IWF; and the forwarding mode identifier is used for indicating that after the handover, data of the source eNB is to be directly forwarded to a target eNB, or indirectly forwarded to the target eNB, where whether a direct forwarding mode or an indirect forwarding mode is selected needs to be determined according to network and device configurations.

503: The target MME sends a connection establishment request to the MTC-IWF.

504: The MTC-IWF sends a connection establishment response to the target MME, to complete establishment of the connection between the target MME and the MTC-IWF.

505: The target MME sends a handover request to the target eNB.

506: The target eNB sends a handover request acknowledgment message to the target MME.

507: The target MME sends a relocation response to the source MME, where the relocation response carries indication information indicating that the data is to be forwarded by using the signaling plane.

508: The source MME sends a handover command to the source eNB, where the handover command carries the indication information indicating that the data is to be forwarded by using the signaling plane, and the forwarding mode identifier.

509: The source eNB sends a handover command to the UE.

510: The source eNB forwards, according to a forwarding mode indicated by the forwarding mode identifier carried in the handover command, the data to the target eNB by using the signaling plane, which includes:

If the forwarding mode indicated by the forwarding mode identifier is direct forwarding, perform:

510a: The source eNB directly forwards the data to the target eNB.

If the forwarding mode indicated by the forwarding mode identifier is indirect forwarding, perform:

510b: The source eNB sends the data to the source MME, then the source MME forwards the data to the target MME by using a signaling plane bearer, and then the target MME forwards the data to the target eNB.

In addition, the forwarded data herein generally refers to small data, for example, the data may be data less than 1000 bytes.

511: After the UE is successfully synchronized to a cell of the target eNB, the UE sends a handover acknowledgment message to the target eNB.

512: The target eNB sends the data to the UE.

513: The target eNB sends a handover complete notification message to the target MME.

514: The target MME sends a relocation complete notification message to the source MME.

515: The source MME sends a relocation complete acknowledgment message to the target MME.

516: The target MME sends a handover complete notification message to the MTC-IWF.

517: The MTC-IWF updates serving node information by replacing an address of the source MME with an address of the target MME.

518: The MTC-IWF sends a handover complete acknowledgment message to the target MME. In this case, the uplink and downlink data transmission path of the signaling plane is UE-target eNB-target MME-MTC-IWF.

In this way, a handover of UE in an E-UTRAN is completed, and it is implemented that small data is forwarded by using a signal connection during a handover without a default bearer.

Figure 6A:
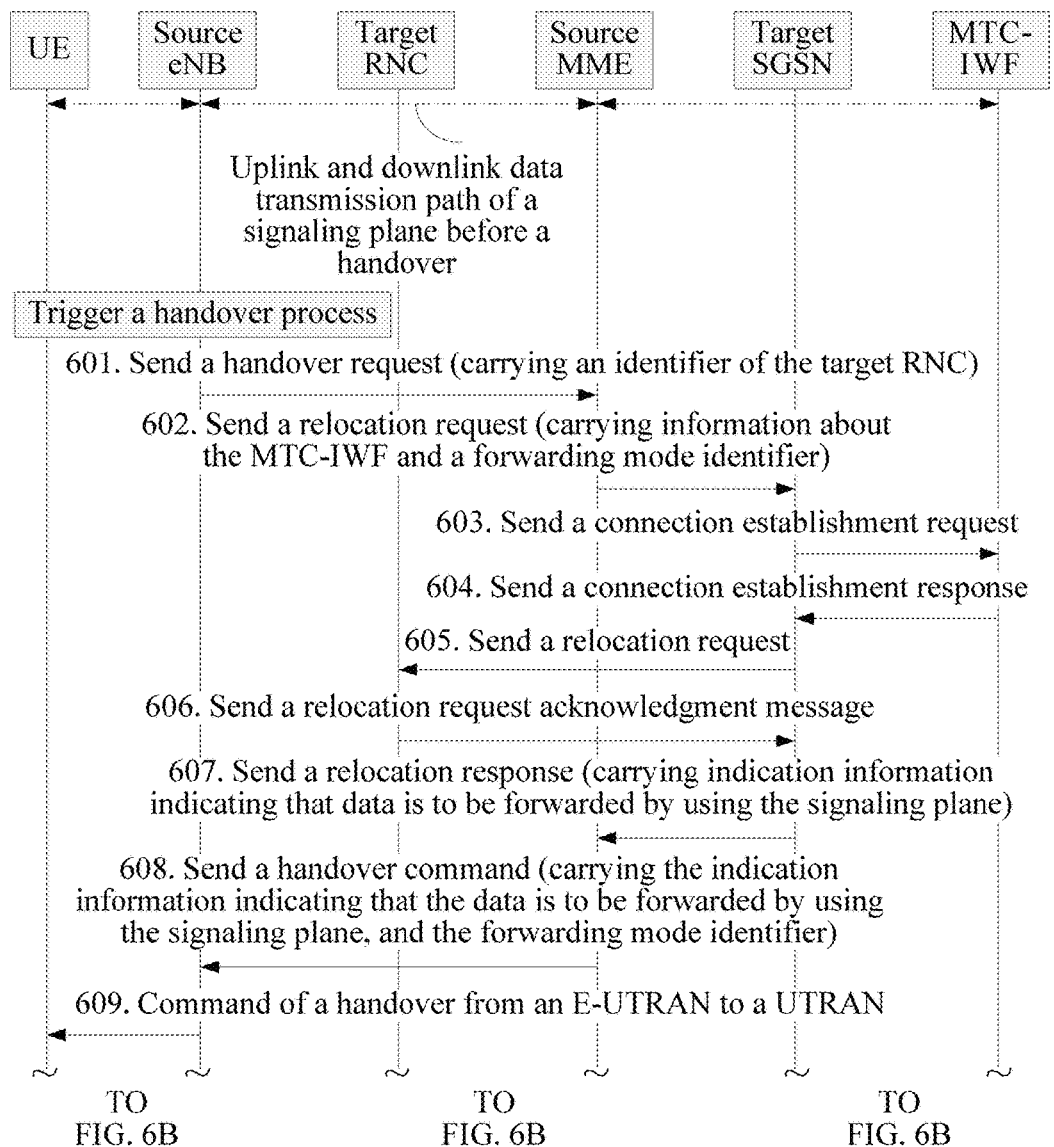
FIG. 6A and FIG. 6B are a schematic flowchart of interaction of a method for a handover without a default bearer according to an embodiment of the present application.
Figure 6B:
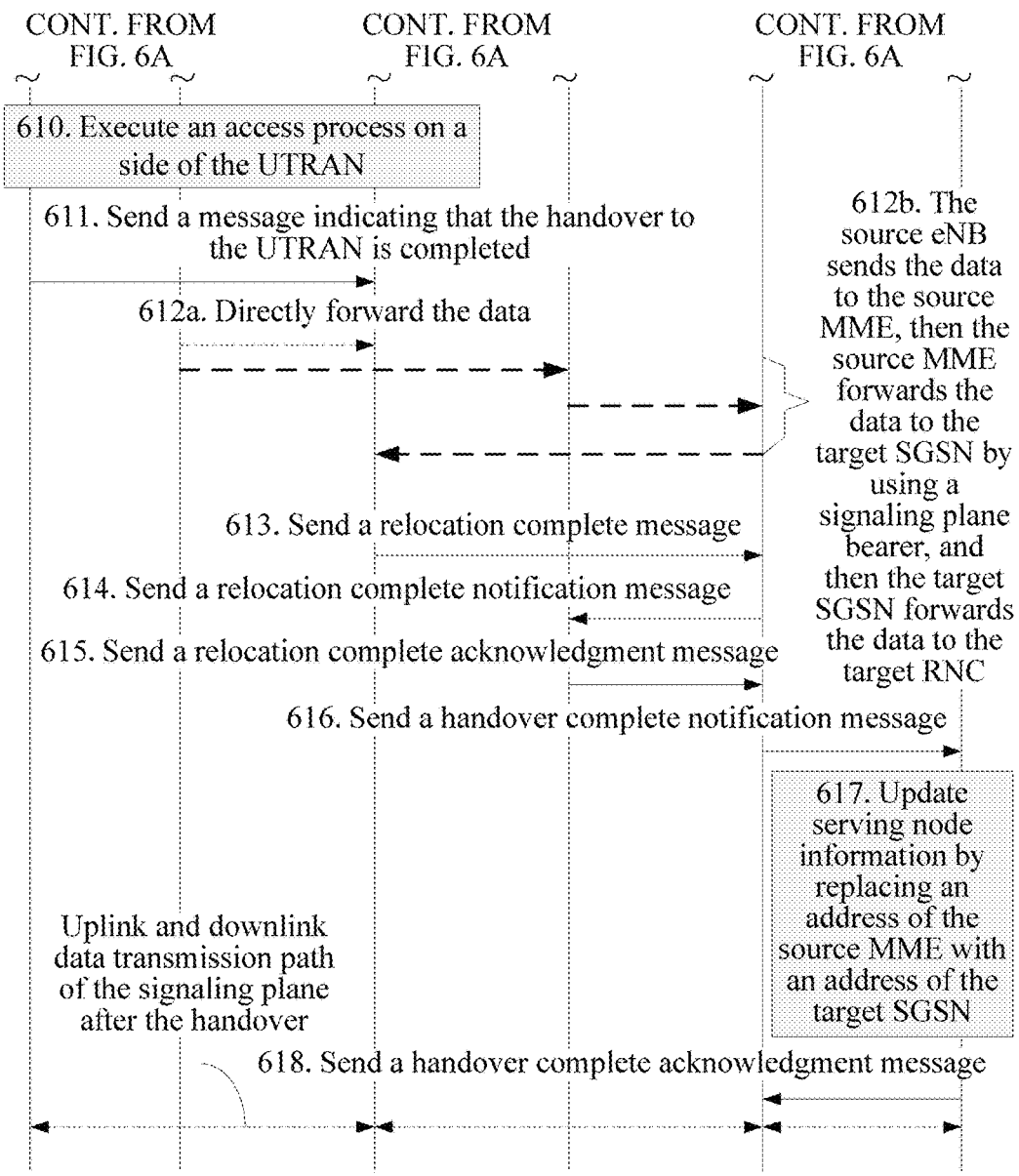

Alternatively, an embodiment of the present application further provides another method for a handover without a default bearer. In this embodiment, a handover from an E-UTRAN to a UTRAN is used as an example. Therefore, in this embodiment, a first network device is a source MME, a second network device is a target RNC, a third network device is an MTC-IWF, a source network device is a source eNB, and a target network device is a target SGSN. In addition, for ease of description, user equipment is referred to as UE for short. As shown in FIG. 6A and FIG. 6B, the method includes:

601: After an inter-system handover process is triggered, a source eNB sends a handover request to a source MME. Before a handover, an uplink and downlink data transmission path of a signaling plane is MTC-IWF-source MME-source eNB-UE, and data is carried by using NAS signaling.

The handover request sent by the eNB to the source MME further includes an identifier of a target RNC.

602: The source MME determines, according to the identifier of the target RNC, that a current handover is an inter-system handover, and the source MME sends a relocation request to a target SGSN, where the relocation request carries information about the MTC-IWF and a forwarding mode identifier. The information about the MTC-IWF may be an address of the MTC-IWF, and is used for the target SGSN to establish a connection to the MTC-IWF; and the forwarding mode identifier is used for indicating that after the handover, data of the source eNB is to be directly forwarded to the target RNC, or indirectly forwarded to the target RNC, where whether a direct forwarding mode or an indirect forwarding mode is selected needs to be determined according to network and device configurations.

603: The target SGSN sends a connection establishment request to the MTC-IWF.

604: The MTC-IWF sends a connection establishment response to the target SGSN, to complete establishment of the connection between the target SGSN and the MTC-IWF.

605: The target SGSN sends a relocation request to the target RNC.

606: The target RNC sends a relocation request acknowledgment message to the target SGSN.

607: The target SGSN sends a relocation response to the source MME, where the relocation response carries indication information indicating that the data is to be forwarded by using the signaling plane.

608: The source MME sends a handover command to the source eNB, where the handover command carries the indication information indicating that the data is to be forwarded by using the signaling plane, and the forwarding mode identifier.

609: The source eNB sends a command of a handover from an E-UTRAN to a UTRAN to the UE.

610: The UE executes an access process on a side of the UTRAN.

611: After the UE accesses the UTRAN, the UE sends, to the target RNC, a message indicating that the handover to the UTRAN is completed.

612: The source eNB forwards, according to a forwarding mode indicated by the forwarding mode identifier carried in the handover command, the data to the target RNC by using the signaling plane, which includes:

If the forwarding mode indicated by the forwarding mode identifier is direct forwarding, perform:

612a: The source eNB directly forwards the data to the target RNC.

If the forwarding mode indicated by the forwarding mode identifier is indirect forwarding, perform:

612b: The source eNB sends the data to the source MME, then the source MME forwards the data to the target SGSN by using a signaling plane bearer, and then the target SGSN forwards the data to the target RNC, so that after the handover of the UE is completed, the UE receives the data sent by the target RNC.

The forwarded data herein generally refers to small data, for example, the data may be data less than 1000 bytes.

613: The target RNC sends a relocation complete message to the target SGSN.

614: The target SGSN sends a relocation complete notification message to the source MME.

615: The source MME sends a relocation complete acknowledgment message to the target SGSN.

616: The target SGSN sends a handover complete notification message to the MTC-IWF.

617: The MTC-IWF updates serving node information by replacing an address of the source MME with an address of the target SGSN.

618: The MTC-IWF sends a handover complete acknowledgment message to the target SGSN. In this case, the uplink and downlink data transmission path of the signaling plane is UE-target RNC-target SGSN-MTC-IWF.

In this way, a handover of UE from an E-UTRAN to a UTRAN is completed, and it is implemented that small data is forwarded by using a signal connection during a handover without a default bearer. Certainly, by using the foregoing method, a handover of UE from a UTRAN to an E-UTRAN can also be implemented, of which a method is basically the same as the method of FIG. 6A and FIG. 6B, and a difference lies in that when UE is handed over from a UTRAN to an E-UTRAN, a first user equipment is a source SGSN, a second user equipment is a target MME, a third network device is an MTC-IWF, a source network device is a source RNC, and a target network device is a target eNB; except this part, the other part is the same as that of the method shown in FIG. 6A and FIG. 6B, and details are not described herein again.

Figure 7A:
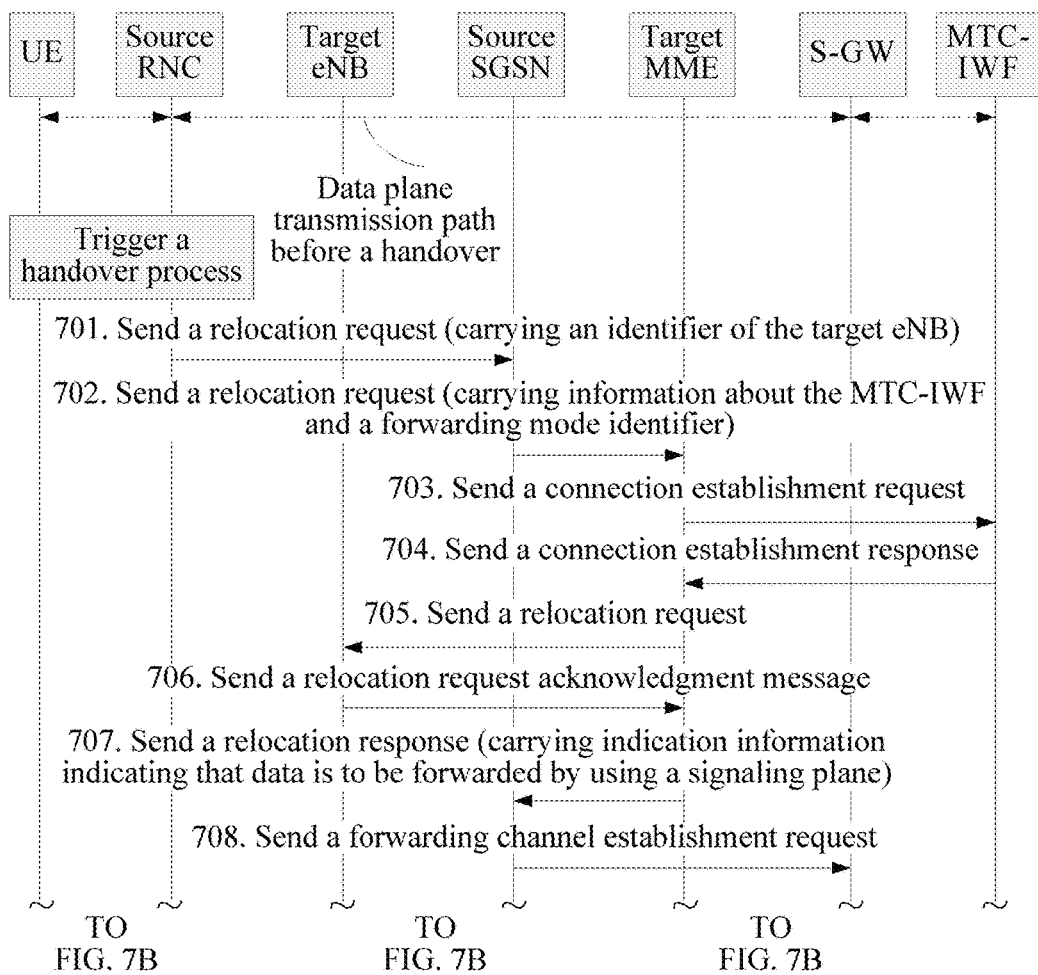
FIG. 7A and FIG. 7B are a schematic flowchart of interaction of a method for a handover without a default bearer according to an embodiment of the present application.
Figure 7B:
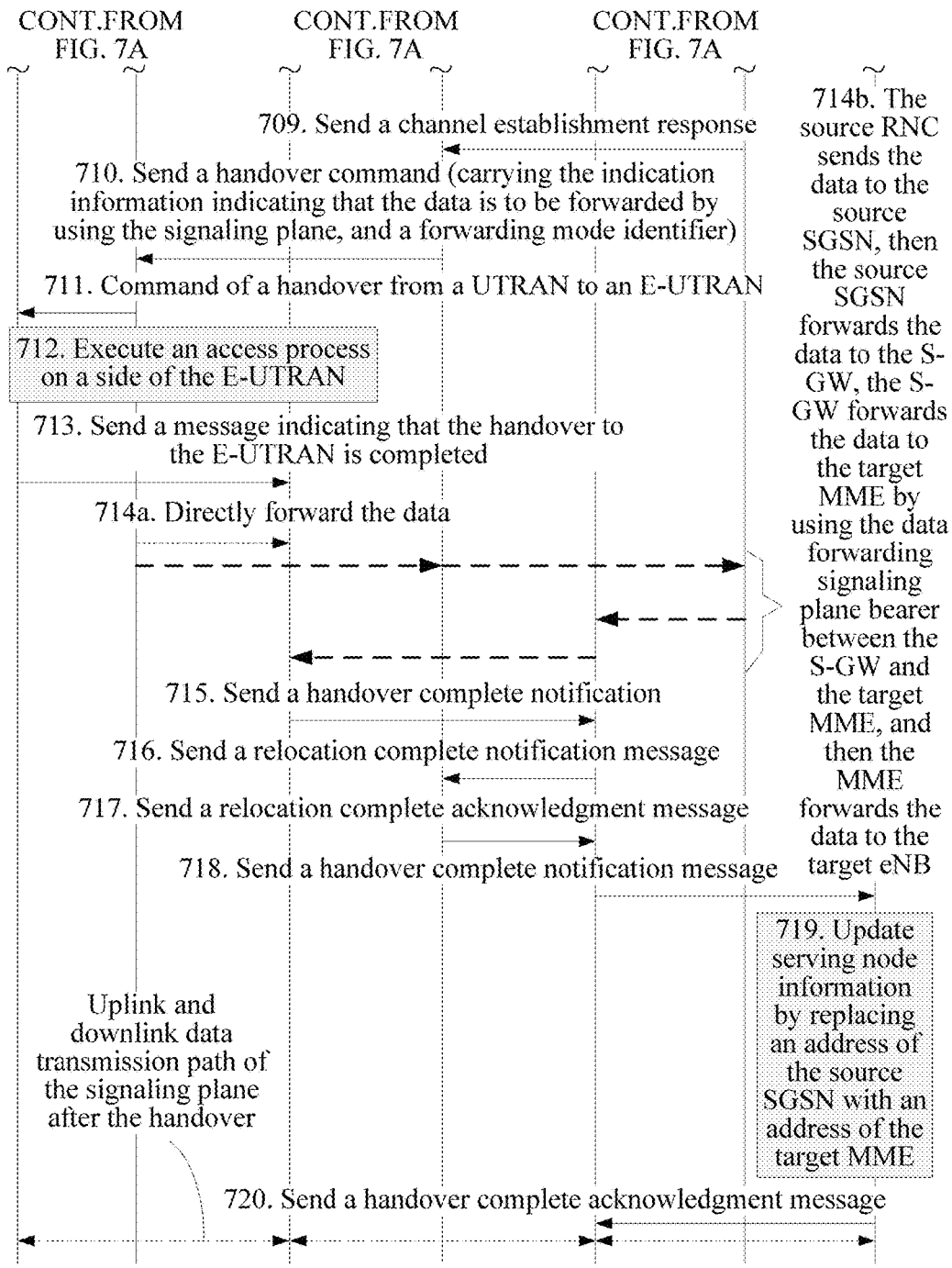

Alternatively, an embodiment of the present application further provides another method for a handover without a default bearer. Before a handover, data is transmitted by using a data plane bearer, but after the handover, a system has no default bearer. In this embodiment, a handover from a UTRAN having a data plane bearer to an E-UTRAN having no default bearer is used as an example. Therefore, in this embodiment, a first user equipment is a source SGSN, a second user equipment is a target MME, a third network device is an MTC-IWF, a source network device is a source RNC, and a target network device is a target eNB. In addition, for ease of description, user equipment is referred to as UE for short. As shown in FIG. 7A and FIG. 7B, the method includes:

701: After an inter-system handover process is triggered, a source RNC sends a relocation request to a source SGSN. Before a handover, data is transmitted by using a data plane, and an uplink and downlink data transmission path is UE-source RNC-S-GW-MTC-IWF.

702: The source SGSN determines, according to an identifier of a target eNB, that a current handover is an inter-system handover, and sends a relocation request to a target MME, where the relocation request carries information about the MTC-IWF and a forwarding mode identifier. The information about the MTC-IWF may be an address of the MTC-IWF, and is used for the target MME to establish a connection to the MTC-IWF; and the forwarding mode identifier is used for indicating that after the handover, data of the source RNC is to be directly forwarded to the target eNB, or indirectly forwarded to the target eNB, where whether a direct forwarding mode or an indirect forwarding mode is selected needs to be determined according to network and device configurations.

703: The target MME sends a connection establishment request to the MTC-IWF.

704: The MTC-IWF sends a connection establishment response to the target MME, to complete establishment of the connection between the target MME and the MTC-IWF.

705: The target MME sends a relocation request message to the target eNB.

706: The target eNB sends a relocation request acknowledgment message to the target MME.

707: The target MME sends a relocation response to the source SGSN, where the relocation response carries indication information indicating that the data is to be forwarded by using a signaling plane.

Optionally, if the forwarding mode identifier indicates that the data of the source RNC is to be indirectly forwarded to the target eNB after the handover, after 707, the method may further include: 708 and 709; otherwise, after 707, 710 may be directly performed. Specifically:

708: The source SGSN sends a forwarding channel establishment request to the S-GW, to establish a data forwarding signaling plane bearer between the S-GW and the target MME.

709: The S-GW sends a channel establishment response to the source SGSN.

710: The source SGSN sends a handover command to the source RNC, where the handover command carries the indication information indicating that the data is to be forwarded by using the signaling plane, and the forwarding mode identifier.

711: The source RNC sends a command of a handover from a UTRAN to an E-UTRAN to the UE.

712: The UE executes an access process on a side of the E-UTRAN.

713: After the UE accesses the E-UTRAN, the UE sends, to the target eNB, a message indicating that the handover to the E-UTRAN is completed.

714: The source eNB forwards, according to a forwarding mode indicated by the forwarding mode identifier carried in the handover command, the data to the target RNC by using the signaling plane, which includes:

If the forwarding mode indicated by the forwarding mode identifier is direct forwarding, perform:

714a: The source RNC directly forwards the data to the target eNB.

If the forwarding mode indicated by the forwarding mode identifier is indirect forwarding, perform:

714b: The source RNC sends the data to the source SGSN, then the source SGSN forwards the data to the S-GW, the S-GW forwards the data to the target MME by using the data forwarding signaling plane bearer established in 709 and 710 between the S-GW and the target MME, and then the MME forwards the data to the target eNB, so that after the handover of the UE is completed, the UE receives the data sent by the target eNB.

715: The target eNB sends a handover complete notification to the target MME.

716: The target MME sends a relocation complete notification message to the source SGSN.

717: The source SGSN sends a relocation complete acknowledgment message to the target MME.

718: The target MME sends a handover complete notification to the MTC-IWF.

719: The MTC-IWF updates serving node information by replacing an address of the source SGSN with an address of the target MME.

720: The MTC-IWF sends a handover complete acknowledgment message to the target MME. In this case, the uplink and downlink data transmission path of the signaling plane is UE-target eNB-target MME-MTC-IWF.

In this way, a handover of UE from a UTRAN having a data plane bearer to an E-UTRAN having no default bearer is completed, and it is implemented that small data is forwarded by using a signal connection during a handover without a default bearer. Certainly, by using the foregoing method, a handover of UE from an E-UTRAN having a data plane bearer to a UTRAN having no default bearer can also be implemented, of which a method is basically the same as the method of FIG. 7A and FIG. 7B, and a difference lies in that when UE is handed over from an E-UTRAN having a data plane bearer to a UTRAN having no default bearer, a first network device is a source MME, a second network device is a target RNC, a third network device is an MTC-IWF, a source network device is a source eNB, and a target network device is a target SGSN; the other part is the same as that of the method shown in FIG. 7A and FIG. 7B, and details are not described herein again.

Figure 8A:
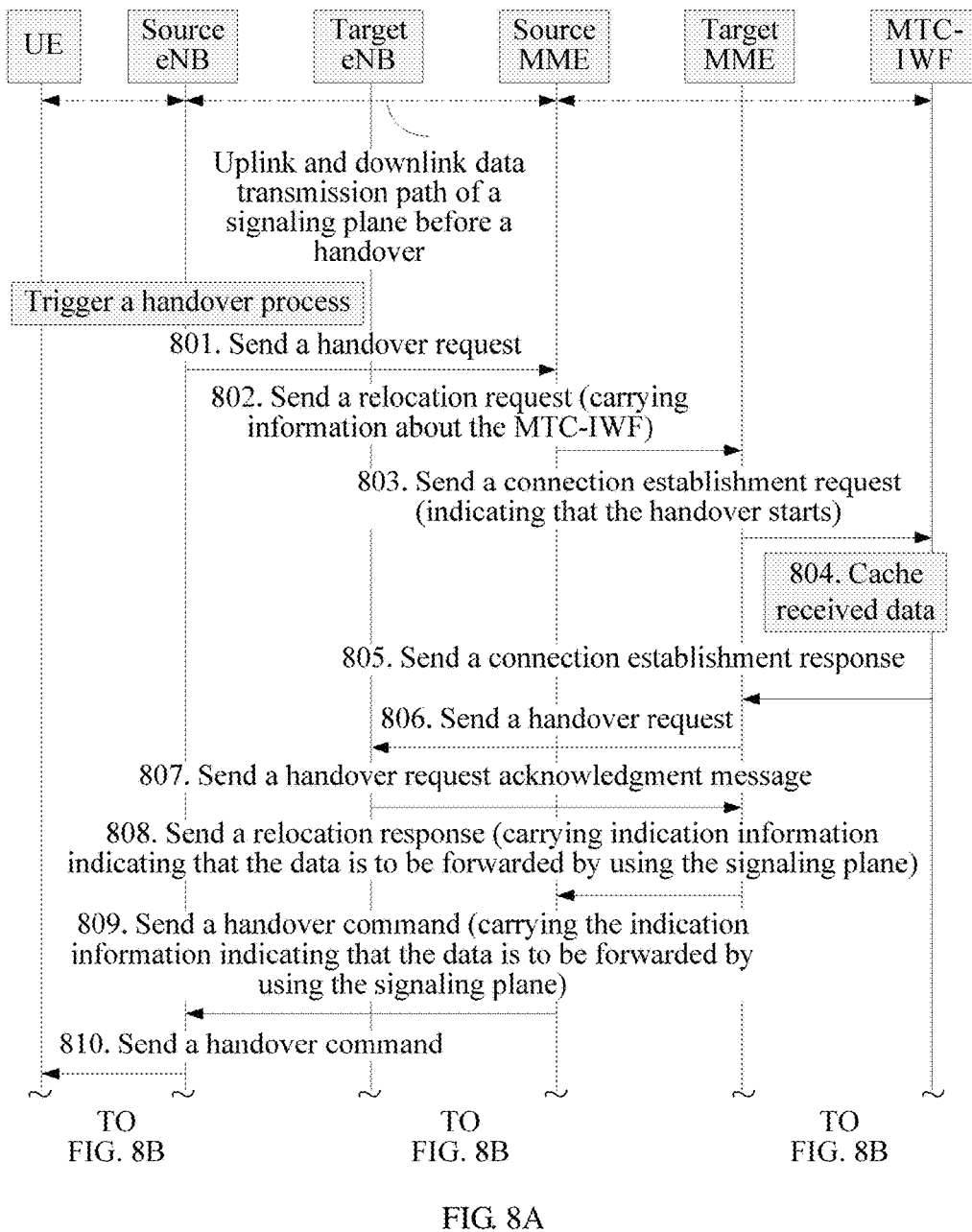
FIG. 8A and FIG. 8B are a schematic flowchart of interaction of a method for a handover without a default bearer according to an embodiment of the present application.
Figure 8B:
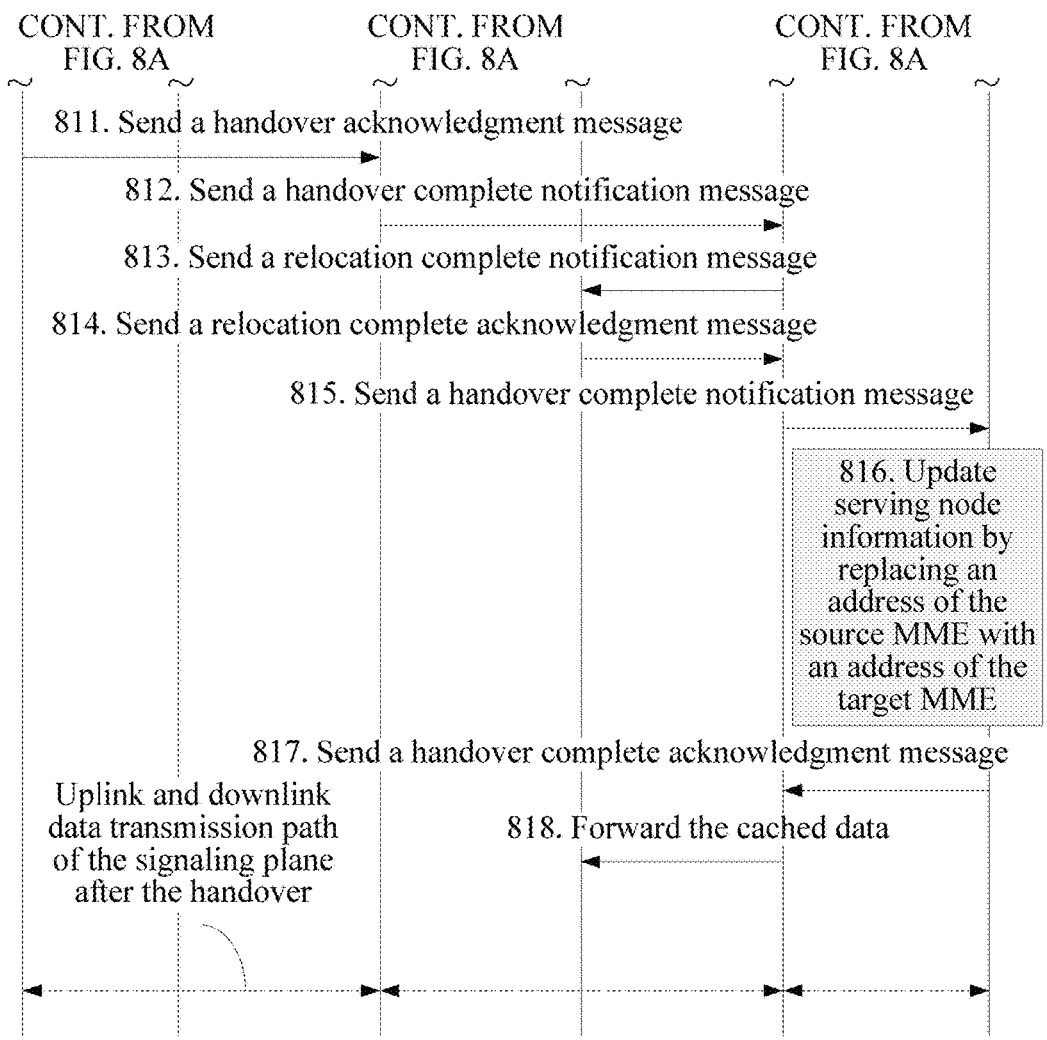

Alternatively, in another implementation manner, an embodiment of the present application provides another method for a handover without a default bearer. In this embodiment, a handover in an E-UTRAN is used as an example. Therefore, in this embodiment, a first network device is a source MME, a second network device is a target MME, a third network device is an MTC-IWF, a source network device is a source eNB, and a target network device is a target eNB. In addition, for ease of description, user equipment is referred to as UE for short. As shown in FIG. 8A and FIG. 8B, the method includes:

801: After a handover process is triggered, a source eNB sends a handover request to a source MME. Before a handover, an uplink and downlink data transmission path of a signaling plane is MTC-IWF-source MME-source eNB-UE, and data is carried by using NAS signaling.

802: The source MME selects a target MME, and sends a relocation request to the target MME, where the relocation request carries information about the MTC-IWF, where the information about the MTC-IWF may be an address of the MTC-IWF, and is used for the target MME to establish a connection to the MTC-IWF.

803: The target MME sends a connection establishment request to the MTC-IWF, where the message carries a handover start indication.

804: After the MTC-IWF receives the handover start indication of the target MME, the MTC-IWF caches received data.

805: The MTC-IWF sends a connection establishment response to the target MME, to complete establishment of the connection between the target MME and the MTC-IWF.

806: The target MME sends a handover request to a target eNB.

807: The target eNB sends a handover request acknowledgment message to the target MME.

808: The target MME sends a relocation response to the source MME, where the relocation response carries indication information indicating that the data is to be forwarded by using the signaling plane.

809: The source MME sends a handover command to the source eNB, where the handover command carries the indication information indicating that the data is to be forwarded by using the signaling plane.

810: The source eNB sends a handover command to the UE.

811: After the UE is successfully synchronized to a cell of the target eNB, the UE sends a handover acknowledgment message to the target eNB.

812: The target eNB sends a handover complete notification message to the target MME.

813: The target MME sends a relocation complete notification message to the source MME.

814: The source MME sends a relocation complete acknowledgment message to the target MME.

815: The target MME sends a handover complete notification message to the MTC-IWF.

816: The MTC-IWF updates serving node information by replacing an address of the source MME with an address of the target MME.

817: The MTC-IWF sends a handover complete acknowledgment message to the target MME.

818: The MTC-IWF sends the cached data to the target MME, so that the target MME forwards the data to the target eNB, and the target eNB forwards the data to the UE. In this case, the uplink and downlink data transmission path of the signaling plane is UE-target eNB-target MME-MTC-IWF.

In this way, a handover of UE in an E-UTRAN is completed in another manner, and it is implemented that small data is forwarded by using a signal connection during a handover without a default bearer.

In addition, the method provided in this embodiment is also applicable to a handover between an E-UTRAN and a UTRAN, and a difference is that when an executed handover is a handover from the E-UTRAN to the UTRAN, a first network device is a source MME, a second network device is a target SGSN, a third network device is an MTC-IWF, a source network device is a source eNB, and a target network device is an RNC; or when an executed handover is a handover from the UTRAN to the E-UTRAN, a first network device is a source SGSN, a second network device is a target MME, a third network device is an MTC-IWF, a source network device is a source RNC, and a target network device is a target eNB. The other part is the same as that of the method shown in FIG. 8A and FIG. 8B, and details are not described herein again.

The embodiments of the present application provide a method for a handover without a default bearer. After user equipment triggers a handover process, a first network device sends a relocation request to a second network device, then the second network device establishes a connection to a third network device indicated by the relocation request, then the second network device returns a relocation response to the first network device, to indicate that data is to be forwarded by using a signaling plane, and then the first network device sends a handover command to a source network device, so that the source network device forwards, according to a forwarding mode indicated by a forwarding mode identifier carried in the handover command, the data to a target network device by using the signaling plane, and after a handover of the user equipment is completed, the user equipment receives the data forwarded by the target network device; or after the second network device establishes the connection to the third network device indicated by the relocation request, the third network device caches data, and after a handover of the user equipment is completed, the second network device receives the data forwarded by a target network device and forwards the data to the user equipment. This solves an issue that when there is no default bearer in an evolved packet system, small data is forwarded by using a signal connection when user equipment is handed over between cells.

Figure 9:
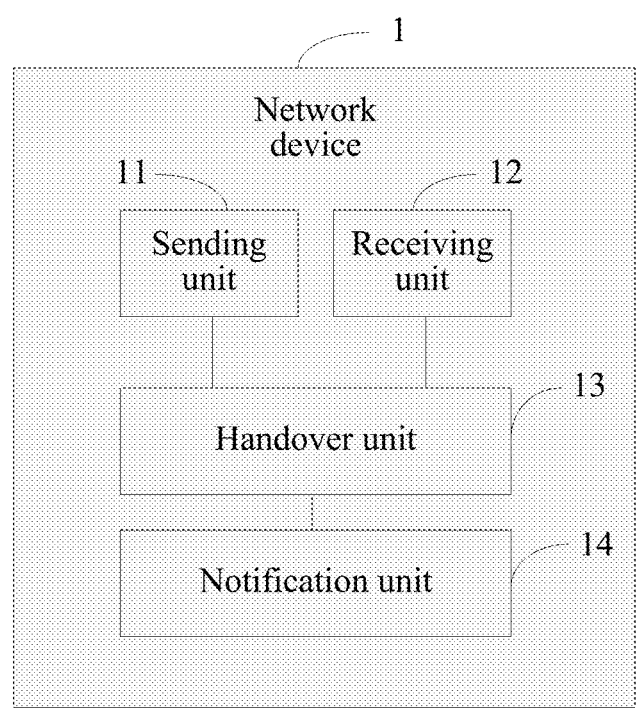
FIG. 9 is a schematic structural diagram of a network device according to an embodiment of the present application.

An embodiment of the present application provides a network device 1, which may be used as a first network device in embodiments of the present application. As shown in FIG. 9, the network device 1 includes. A number of units.

A sending unit 11 is configured to send a relocation request to a second network device. The relocation request includes information about a third network device and a forwarding mode identifier. The information about the third network device is used for the second network device to establish a connection to the third network device, and the forwarding mode identifier is used for indicating direct forwarding or indirect forwarding.

A receiving unit 12 is configured to receive a relocation response sent by the second network device. The relocation response carries indication information indicating that data is to be forwarded by using a signaling plane.

A handover unit 13 is configured to send a handover command to a source network device, so that the source network device forwards the data to a target network device according to a forwarding mode indicated by the forwarding mode identifier carried in the handover command.

A notification unit 14 is configured to send a relocation complete message to the second network device, so that the second network device sends a handover complete notification message to the third network device, and the third network device updates serving node information from an address of the network device 1 to an address of the second network device.

Optionally, when an executed handover is an internal handover in an E-UTRAN or a handover between an E-UTRAN and a UTRAN: the handover unit 13 is specifically configured to send the handover command to the source network device, where the forwarding mode identifier carried in the handover command instructs the source network device to directly forward the data to the target network device; or the handover unit 13 is specifically configured to send the handover command to the source network device, where the forwarding mode identifier carried in the handover command instructs the source network device to indirectly forward the data; the receiving unit 12 is further configured to receive the data sent by the source network device; and the sending unit 11 is further configured to forward the data to the second network device by using a signaling plane bearer, so that the second network device sends the data to the target network device.

Optionally, when an executed handover is a handover between an E-UTRAN and a UTRAN, and a side of a network before the handover has a default bearer and a side of a network after the handover has no default bearer: the handover unit 13 is specifically configured to send the handover command to the source network device, where the forwarding mode identifier carried in the handover command instructs the source network device to directly forward the data to the target network device; or the handover unit 13 is specifically configured to send the handover command to the source network device, where the forwarding mode identifier carried in the handover command instructs the source network device to indirectly forward the data; the receiving unit 12 is further configured to receive the data sent by the source network device; and the sending unit 11 is further configured to forward the data to a serving gateway, so that the serving gateway forwards the data to the second network device by using a signaling plane bearer.

Figure 10:
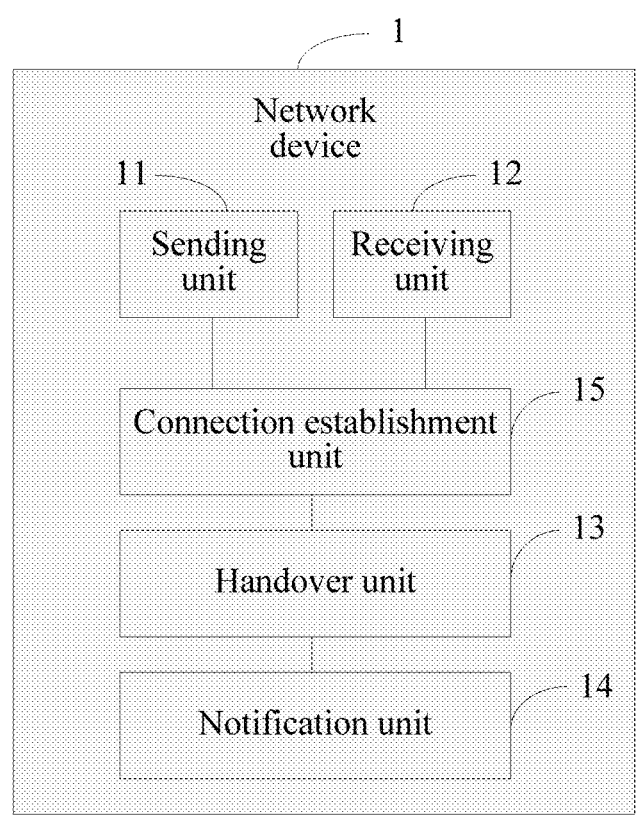
FIG. 10 is a schematic structural diagram of a network device according to an embodiment of the present application.

Optionally, if the forwarding mode identifier instructs the source network device to indirectly forward the data, after the relocation response sent by the second network device is received: the sending unit 11 is further configured to send a forwarding channel establishment request to the serving gateway; the receiving unit 12 is further configured to receive a forwarding channel establishment response sent by the serving gateway; and as shown in FIG. 10, the network device 1 further includes: a connection establishment unit 15, configured to establish the signaling plane bearer between the serving gateway and the second network device.

When the executed handover is the internal handover in the E-UTRAN, the network device 1 is a source mobility management entity, the second network device is a target mobility management entity, the third network device is a machine type communication interworking function MTC-IWF, the source network device is a source base station, and the target network device is a target base station; or when the executed handover is a handover from the E-UTRAN to the UTRAN, the network device 1 is a source mobility management entity, the second network device is a target serving general packet radio service support node SGSN, the third network device is an MTC-IWF, the source network device is a source base station, and the target network device is a target radio network controller RNC; or when the executed handover is a handover from the UTRAN to the E-UTRAN, the network device is a source SGSN, the second network device is a target mobility management entity, the third network device is an MTC-IWF, the source network device is a source RNC, and the target network device is a target base station.

Figure 11:
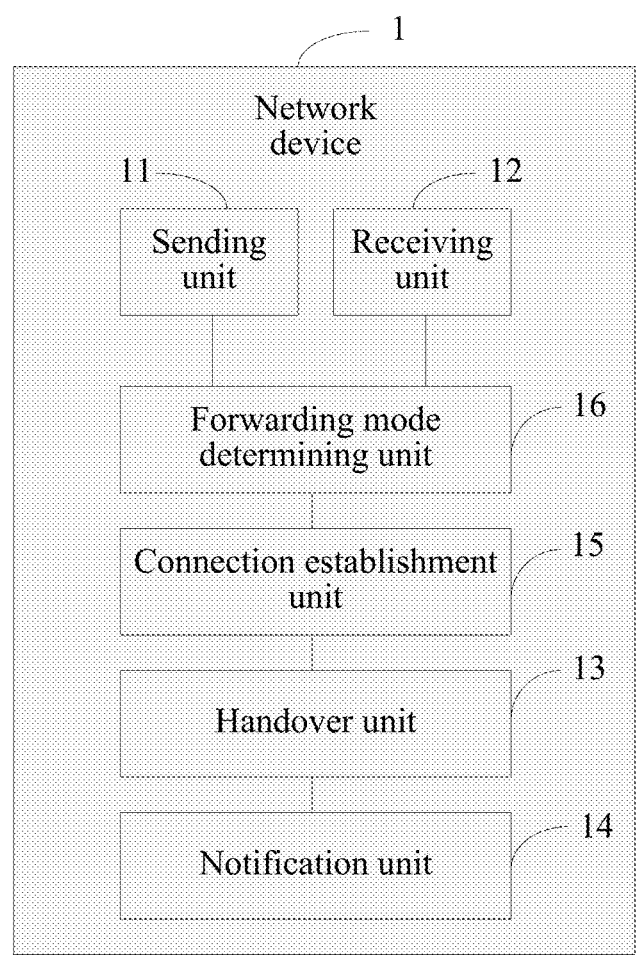
FIG. 11 is a schematic structural diagram of a network device according to an embodiment of the present application.

Optionally, the receiving unit 12 is further configured to receive a handover request message of the source network device, where the handover request message includes an identifier of the target network device; and as shown in FIG. 11, the network device 1 further includes: a forwarding mode determining unit 16, configured to determine, according to the identifier of the target network device, that the executed handover is the handover between the E-UTRAN and the UTRAN.

This embodiment of the present application provides a network device. After user equipment triggers a handover process, the network device sends a relocation request to a second network device, then the second network device establishes a connection to a third network device indicated by the relocation request, then the second network device returns a relocation response to the network device, to indicate that data is to be forwarded by using a signaling plane, and then the network device sends a handover command to a source network device, so that the source network device forwards, according to a forwarding mode indicated by a forwarding mode identifier carried in the handover command, the data to a target network device by using the signaling plane, and after a handover of the user equipment is completed, the user equipment receives the data forwarded by the target network device. This solves an issue that when there is no default bearer in an evolved packet system, small data is forwarded by using a signal connection when user equipment is handed over between cells.

Figure 12:
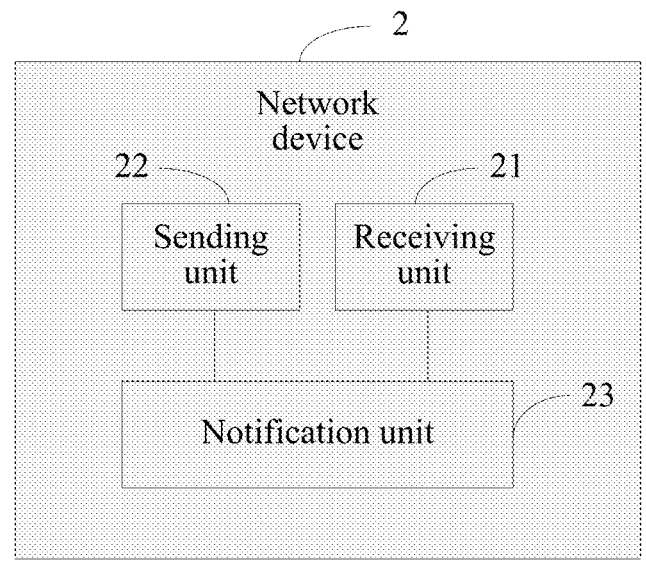
FIG. 12 is a schematic structural diagram of a network device according to an embodiment of the present application.

An embodiment of the present application provides a network device 2, which may be used as a second network device in embodiments of the present application. As shown in FIG. 12, the network device 2 includes: a receiving unit 21, configured to receive a relocation request sent by a first network device, where the relocation request includes information about a third network device and a forwarding mode identifier, where the information about the third network device is used for the network device 2 to establish a connection to the third network device, and the forwarding mode identifier is used for indicating direct forwarding or indirect forwarding; a sending unit 22, configured to send a relocation response to the first network device, where the relocation response carries indication information indicating that data is to be forwarded by using a signaling plane, so that after the first network device receives the relocation response, the first network device sends a handover command to a source network device, and the source network device forwards the data to a target network device according to a forwarding mode indicated by the forwarding mode identifier carried in the handover command; and a notification unit 23, configured to send a handover complete notification message to the third network device, so that the third network device updates serving node information from an address of the first network device to an address of the network device 2.

When an executed handover is an internal handover in an E-UTRAN, the first network device is a source mobility management entity, the network device 2 is a target mobility management entity, the third network device is a machine type communication interworking function MTC-IWF, the source network device is a source base station, and the target network device is a target base station; or when an executed handover is a handover from an E-UTRAN to a UTRAN, the first network device is a source mobility management entity, the network device 2 is a target serving general packet radio service support node SGSN, the third network device is an MTC-IWF, the source network device is a source base station, and the target network device is a target radio network controller RNC; or when an executed handover is a handover from a UTRAN to an E-UTRAN, the first network device is a source SGSN, the network device is a target mobility management entity, the third network device is an MTC-IWF, the source network device is a source RNC, and the target network device is a target base station.

This embodiment of the present application provides a network device. After user equipment triggers a handover process, a first network device sends a relocation request to the network device, then the network device establishes a connection to a third network device indicated by the relocation request, then the network device returns a relocation response to the first network device, to indicate that data is to be forwarded by using a signaling plane, and then the first network device sends a handover command to a source network device, so that the source network device forwards, according to a forwarding mode indicated by a forwarding mode identifier carried in the handover command, the data to a target network device by using the signaling plane, and after a handover of the user equipment is completed, the user equipment receives the data forwarded by the target network device. This solves an issue that when there is no default bearer in an evolved packet system, small data is forwarded by using a signal connection when user equipment is handed over between cells.

Figure 13:
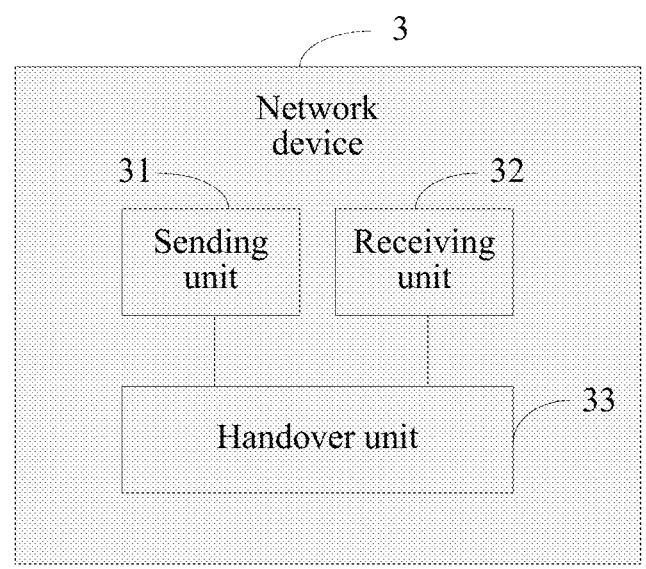
FIG. 13 is a schematic structural diagram of a network device according to an embodiment of the present application.

An embodiment of the present application provides a network device 3, which may be used as a first network device in embodiments of the present application. As shown in FIG. 13, the network device 3 includes: a sending unit 31, configured to send a relocation request to a second network device, where the relocation request includes information about a third network device, where the information about the third network device is used for the second network device to establish a connection to the third network device; a receiving unit 32, configured to: after the second network device establishes the connection to the third network device, and the second network device instructs the third network device to cache data, receive a relocation response sent by the second network device, where the relocation response carries indication information indicating that the data is to be forwarded by using a signaling plane; and a handover unit 33, configured to send a handover command to a source network device, so that the source network device triggers a handover of user equipment according to the handover command, and after the handover of the user equipment is completed, the second network device receives the data sent by the third network device.

When an executed handover is an internal handover in an E-UTRAN, the network device 3 is a source mobility management entity, the second network device is a target mobility management entity, the third network device is a machine type communication interworking function MTC-IWF, the source network device is a source base station, and a target network device is a target base station; or when an executed handover is a handover from an E-UTRAN to a UTRAN, the network device 3 is a source mobility management entity, the second network device is a target serving general packet radio service support node SGSN, the third network device is an MTC-IWF, the source network device is a source base station, and a target network device is a target radio network controller RNC; or when an executed handover is a handover from a UTRAN to an E-UTRAN, the network device is a source SGSN, the second network device is a target mobility management entity, the third network device is an MTC-IWF, the source network device is a source RNC, and a target network device is a target base station.

This embodiment of the present application provides a network device. After user equipment triggers a handover process, the network device sends a relocation request to the second network device, then the second network device establishes a connection to a third network device indicated by the relocation request, after the second network device establishes the connection to the third network device indicated by the relocation request, the third network device caches data, and after a handover of the user equipment is completed, the second network device receives the data forwarded by the target network device and forwards the data to the user equipment. This solves an issue that when there is no default bearer in an evolved packet system, small data is forwarded by using a signal connection when user equipment is handed over between cells.

Figure 14:
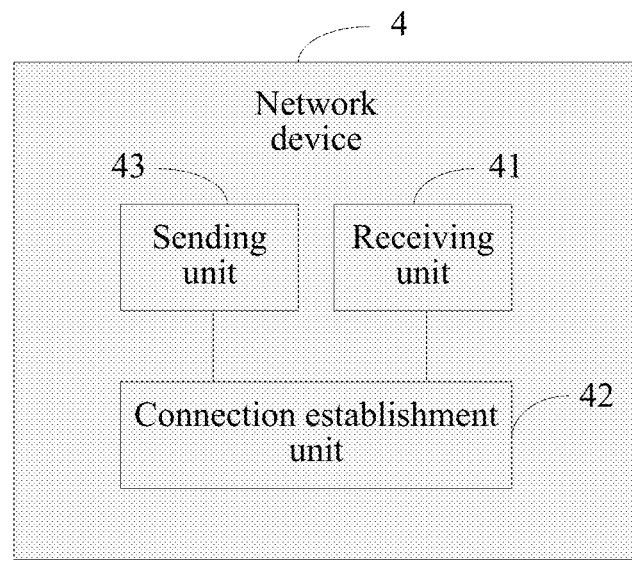
FIG. 14 is a schematic structural diagram of a network device according to an embodiment of the present application.

An embodiment of the present application provides a network device 4, which may be used as a second network device in embodiments of the present application. As shown in FIG. 14, the network device 4 includes: a receiving unit 41, configured to receive a relocation request sent by a first network device, where the relocation request includes information about a third network device, where the information about the third network device is used for the network device to establish a connection to the third network device; a connection establishment unit 42, configured to establish the connection to the third network device, and indicate to the third network device that a handover process of user equipment starts, so that the third network device caches data; and a sending unit 43, configured to send a relocation response to the first network device, where the relocation response carries indication information indicating that the data is to be forwarded by using a signaling plane, where the receiving unit 41 is further configured to receive the data sent by the third network device.

Figure 15:
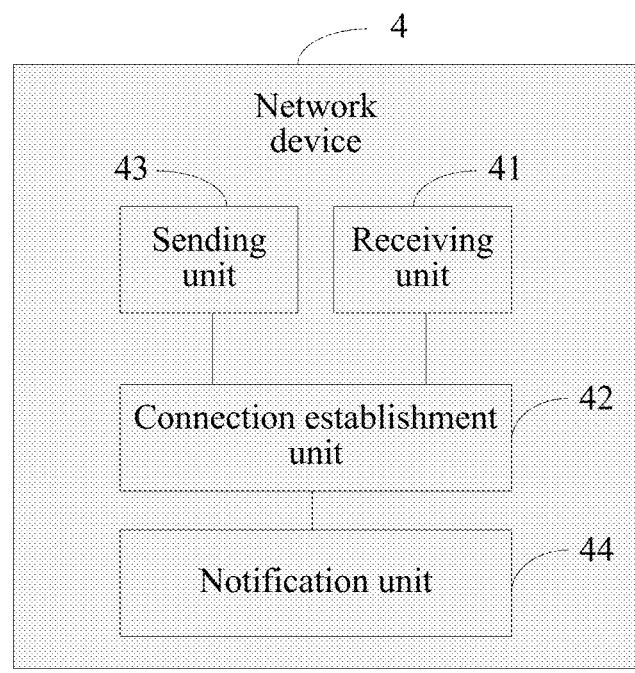
FIG. 15 is a schematic structural diagram of a network device according to an embodiment of the present application.

Optionally, as shown in FIG. 15, the network device 4 may further include: a notification unit 44, configured to: before the data sent by the third network device is received, send a handover complete notification to the third network device, so that the third network device updates serving node information from an address of the first network device to an address of the network device.

When an executed handover is an internal handover in an E-UTRAN, the first network device is a source mobility management entity, the network device 4 is a target mobility management entity, the third network device is a machine type communication interworking function MTC-IWF, a source network device is a source base station, and a target network device is a target base station; or when an executed handover is a handover from an E-UTRAN to a UTRAN, the first network device is a source mobility management entity, the network device 4 is a target serving general packet radio service support node SGSN, the third network device is an MTC-IWF, a source network device is a source base station, and a target network device is a target radio network controller RNC; or when an executed handover is a handover from a UTRAN to an E-UTRAN, the first network device is a source SGSN, the network device is a target mobility management entity, the third network device is an MTC-IWF, a source network device is a source RNC, and a target network device is a target base station.

This embodiment of the present application provides a network device. After user equipment triggers a handover process, a first network device sends a relocation request to the network device, then the network device establishes a connection to a third network device indicated by the relocation request, after the network device establishes the connection to the third network device indicated by the relocation request, the third network device caches data, and after a handover of the user equipment is completed, the network device receives the data forwarded by the target network device and forwards the data to the user equipment. This solves an issue that when there is no default bearer in an evolved packet system, small data is forwarded by using a signal connection when user equipment is handed over between cells.

Figure 16:
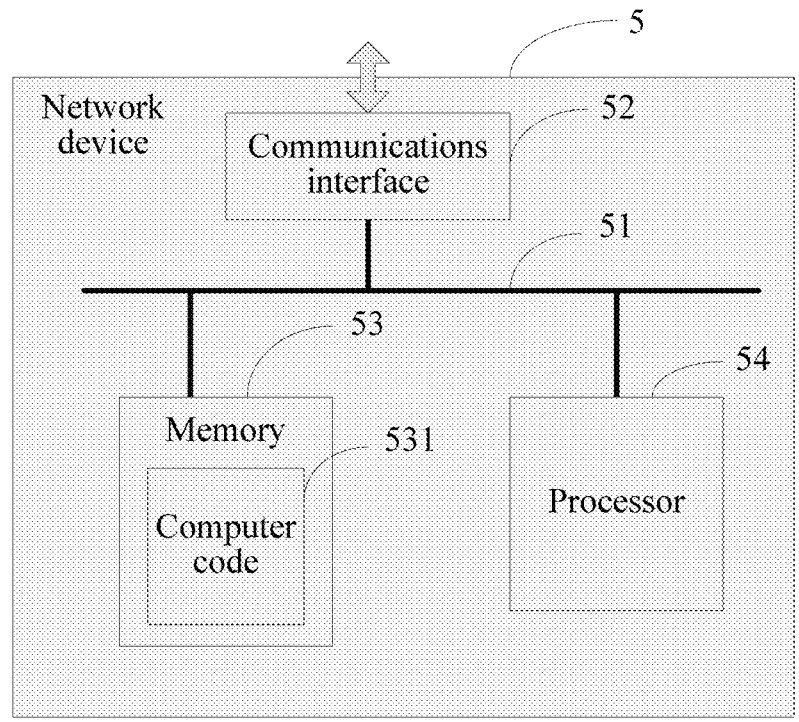
FIG. 16 is a schematic structural diagram of another network device according to an embodiment of the present application.

An embodiment of the present application provides a network device 5, which may be used as a first network device in embodiments of the present application. As shown in FIG. 16, the network device 5 includes: a bus 51, and a communications interface 52, a memory 53, and a processor 54 that are connected onto the bus 51, where the communications interface 52 is configured to communicate with a network element, the memory 53 is configured to store computer code 531, and the processor 54 executes the computer code 531 to: send a relocation request to a second network device, where the relocation request includes information about a third network device and a forwarding mode identifier, where the information about the third network device is used for the second network device to establish a connection to the third network device, and the forwarding mode identifier is used for indicating direct forwarding or indirect forwarding; receive a relocation response sent by the second network device, where the relocation response carries indication information indicating that data is to be forwarded by using a signaling plane; send a handover command to a source network device, so that the source network device forwards the data to a target network device according to a forwarding mode indicated by the forwarding mode identifier carried in the handover command; and send a relocation complete message to the second network device, so that the second network device sends a handover complete notification message to the third network device, and the third network device updates serving node information from an address of the network device to an address of the second network device.

Optionally, when an executed handover is an internal handover in an evolved universal mobile telecommunications system terrestrial radio access network E-UTRAN or a handover between the E-UTRAN and a universal mobile telecommunications system terrestrial radio access network UTRAN, the processor 54 executes the computer code 531 to: send the handover command to the source network device, where the forwarding mode identifier carried in the handover command instructs the source network device to directly forward the data to the target network device; or send the handover command to the source network device, where the forwarding mode identifier carried in the handover command instructs the source network device to indirectly forward the data; receive the data sent by the source network device; and forward the data to the second network device by using a signaling plane bearer, so that the second network device sends the data to the target network device.

Optionally, when an executed handover is a handover between an E-UTRAN and a UTRAN, and a side of a network before the handover has a default bearer and a side of a network after the handover has no default bearer, the processor 54 executes the computer code 531 to: send the handover command to the source network device, where the forwarding mode identifier carried in the handover command instructs the source network device to directly forward the data to the target network device; or send the handover command to the source network device, where the forwarding mode identifier carried in the handover command instructs the source network device to indirectly forward the data; receive the data sent by the source network device; and forward the data to a serving gateway, so that the serving gateway forwards the data to the second network device by using a signaling plane bearer.

Optionally, if the forwarding mode identifier instructs the source network device to indirectly forward the data, the processor 54 executes the computer code 531 to: after the relocation response sent by the second network device is received, send a forwarding channel establishment request to the serving gateway; receive a forwarding channel establishment response sent by the serving gateway; and establish the signaling plane bearer between the serving gateway and the second network device.

When the executed handover is the internal handover in the E-UTRAN, the network device 5 is a source mobility management entity, the second network device is a target mobility management entity, the third network device is a machine type communication interworking function MTC-IWF, the source network device is a source base station, and the target network device is a target base station; or when the executed handover is a handover from the E-UTRAN to the UTRAN, the network device 5 is a source mobility management entity, the second network device is a target serving general packet radio service support node SGSN, the third network device is an MTC-IWF, the source network device is a source base station, and the target network device is a target radio network controller RNC; or when the executed handover is a handover from the UTRAN to the E-UTRAN, the network device is a source SGSN, the second network device is a target mobility management entity, the third network device is an MTC-IWF, the source network device is a source RNC, and the target network device is a target base station.

Optionally, the processor 54 executes the computer code 531 to further: receive a handover request message of the source network device, where the handover request message includes an identifier of the target network device; and determine, according to the identifier of the target network device, that the executed handover is the handover between the E-UTRAN and the UTRAN.

This embodiment of the present application provides a network device. After user equipment triggers a handover process, the network device sends a relocation request to a second network device, then the second network device establishes a connection to a third network device indicated by the relocation request, then the second network device returns a relocation response to the network device, to indicate that data is to be forwarded by using a signaling plane, and then the network device sends a handover command to a source network device, so that the source network device forwards, according to a forwarding mode indicated by a forwarding mode identifier carried in the handover command, the data to a target network device by using the signaling plane, and after a handover of the user equipment is completed, the user equipment receives the data forwarded by the target network device. This solves an issue that when there is no default bearer in an evolved packet system, small data is forwarded by using a signal connection when user equipment is handed over between cells.

Figure 17:
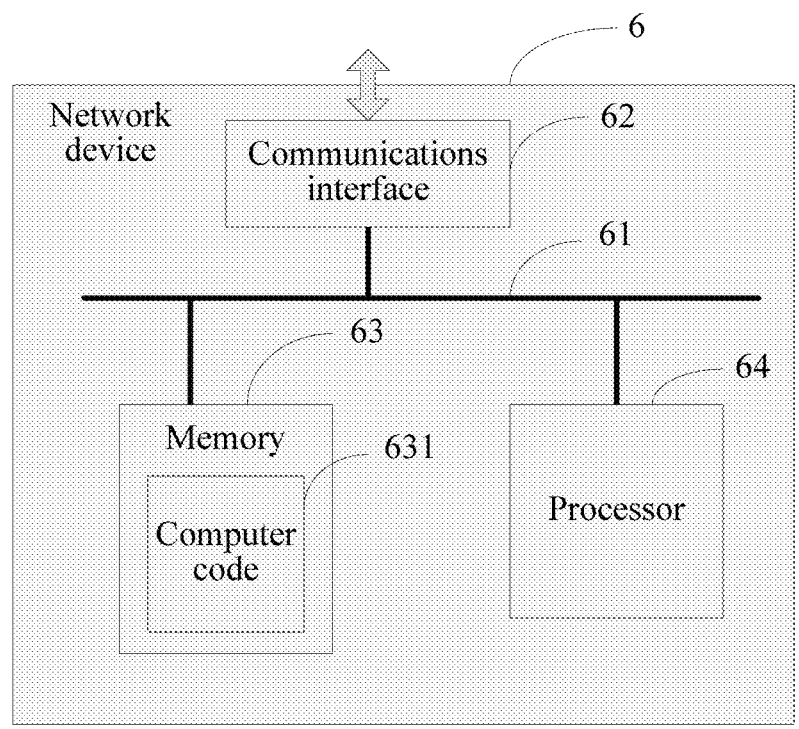
FIG. 17 is a schematic structural diagram of another network device according to an embodiment of the present application.

An embodiment of the present application provides a network device 6, which may be used as a first network device in embodiments of the present application. As shown in FIG. 17, the network device 6 includes: a bus 61, and a communications interface 62, a memory 63, and a processor 64 that are connected onto the bus 61, where the communications interface 62 is configured to communicate with a network element, the memory 63 is configured to store computer code 631, and the processor 64 executes the computer code 631 to: receive a relocation request sent by a first network device, where the relocation request includes information about a third network device and a forwarding mode identifier, where the information about the third network device is used for the network device to establish a connection to the third network device, and the forwarding mode identifier is used for indicating direct forwarding or indirect forwarding; send a relocation response to the first network device, where the relocation response carries indication information indicating that data is to be forwarded by using a signaling plane, so that after the first network device receives the relocation response, the first network device sends a handover command to a source network device, and the source network device forwards the data to a target network device according to a forwarding mode indicated by the forwarding mode identifier carried in the handover command; and send a handover complete notification message to the third network device, so that the third network device updates serving node information from an address of the first network device to an address of the network device.

When an executed handover is an internal handover in an E-UTRAN, the network device 6 is a source mobility management entity, the second network device is a target mobility management entity, the third network device is a machine type communication interworking function MTC-IWF, the source network device is a source base station, and the target network device is a target base station; or when an executed handover is a handover from an E-UTRAN to a UTRAN, the network device 6 is a source mobility management entity, the second network device is a target serving general packet radio service support node SGSN, the third network device is an MTC-IWF, the source network device is a source base station, and the target network device is a target radio network controller RNC; or when an executed handover is a handover from a UTRAN to an E-UTRAN, the network device is a source SGSN, the second network device is a target mobility management entity, the third network device is an MTC-IWF, the source network device is a source RNC, and the target network device is a target base station.

This embodiment of the present application provides a network device. After user equipment triggers a handover process, a first network device sends a relocation request to the network device, then the network device establishes a connection to a third network device indicated by the relocation request, then the network device returns a relocation response to the first network device, to indicate that data is to be forwarded by using a signaling plane, and then the first network device sends a handover command to a source network device, so that the source network device forwards, according to a forwarding mode indicated by a forwarding mode identifier carried in the handover command, the data to a target network device by using the signaling plane, and after a handover of the user equipment is completed, the user equipment receives the data forwarded by the target network device. This solves an issue that when there is no default bearer in an evolved packet system, small data is forwarded by using a signal connection when user equipment is handed over between cells.

Figure 18:
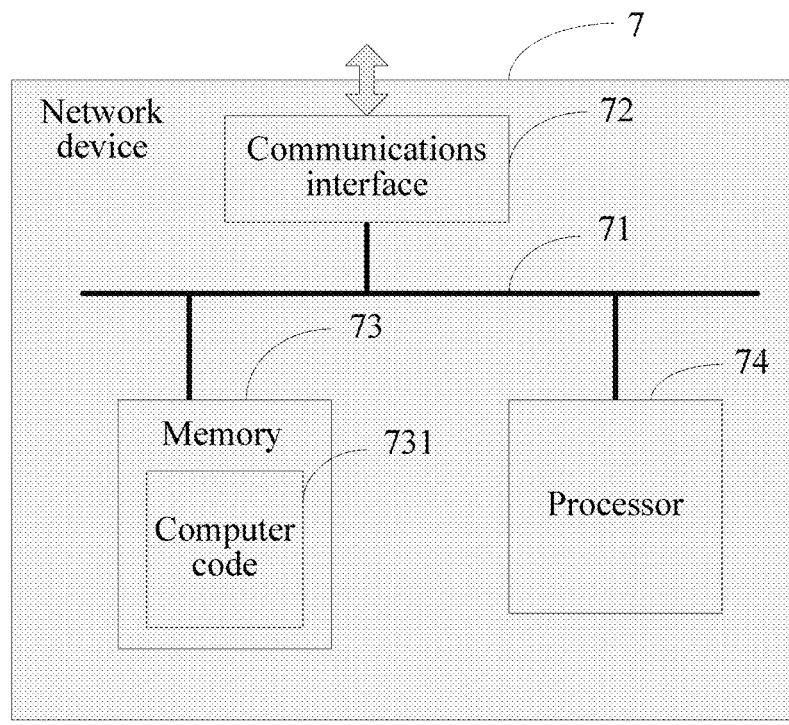
FIG. 18 is a schematic structural diagram of another network device according to an embodiment of the present application.

An embodiment of the present application provides a network device 7, which may be used as a first network device in embodiments of the present application. As shown in FIG. 18, the network device 7 includes: a bus 71, and a communications interface 72, a memory 73, and a processor 64 that are connected onto the bus 71, where the communications interface 72 is configured to communicate with a network element, the memory 73 is configured to store computer code 731, and the processor 74 executes the computer code 731 to: send a relocation request to a second network device, where the relocation request includes information about a third network device, where the information about the third network device is used for the second network device to establish a connection to the third network device; after the second network device establishes the connection to the third network device, and the second network device instructs the third network device to cache data, receive a relocation response sent by the second network device, where the relocation response carries indication information indicating that the data is to be forwarded by using a signaling plane; and send a handover command to a source network device, so that the source network device triggers a handover of user equipment according to the handover command, and after the handover of the user equipment is completed, the second network device receives the data sent by the third network device.

When an executed handover is an internal handover in an E-UTRAN, the network device 7 is a source mobility management entity, the second network device is a target mobility management entity, the third network device is a machine type communication interworking function MTC-IWF, the source network device is a source base station, and a target network device is a target base station; or when an executed handover is a handover from an E-UTRAN to a UTRAN, the network device 7 is a source mobility management entity, the second network device is a target serving general packet radio service support node SGSN, the third network device is an MTC-IWF, the source network device is a source base station, and a target network device is a target radio network controller RNC; or when an executed handover is a handover from a UTRAN to an E-UTRAN, the network device is a source SGSN, the second network device is a target mobility management entity, the third network device is an MTC-IWF, the source network device is a source RNC, and a target network device is a target base station.

This embodiment of the present application provides a network device. After user equipment triggers a handover process, the network device sends a relocation request to the second network device, then the second network device establishes a connection to a third network device indicated by the relocation request, after the second network device establishes the connection to the third network device indicated by the relocation request, the third network device caches data, and after a handover of the user equipment is completed, the second network device receives the data forwarded by the target network device and forwards the data to the user equipment. This solves an issue that when there is no default bearer in an evolved packet system, small data is forwarded by using a signal connection when user equipment is handed over between cells.

Figure 19:
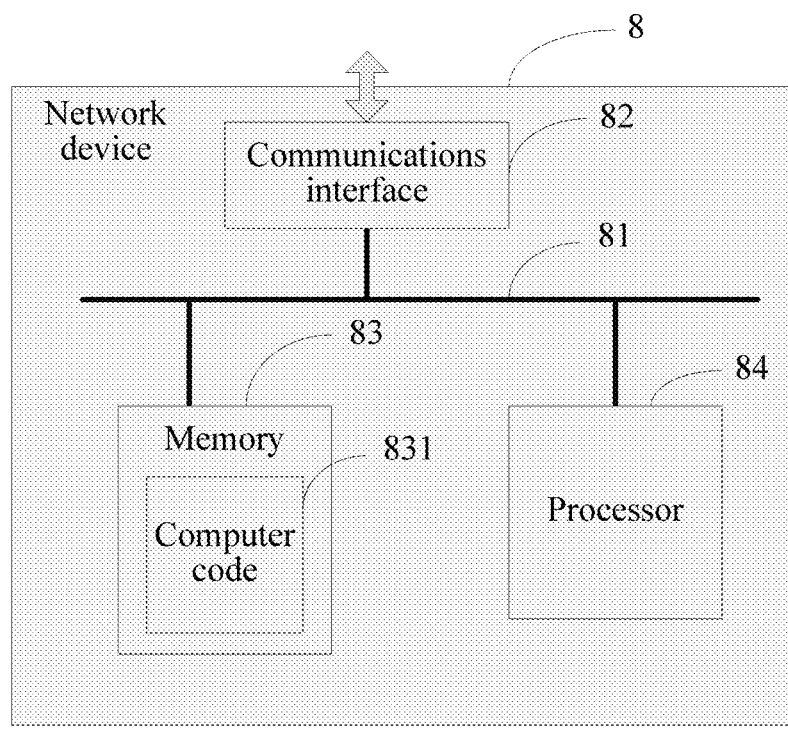
FIG. 19 is a schematic structural diagram of another network device according to an embodiment of the present application.

An embodiment of the present application provides a network device 8, which may be used as a first network device in embodiments of the present application. As shown in FIG. 19, the network device 8 includes: a bus 81, and a communications interface 82, a memory 83, and a processor 84 that are connected onto the bus 81, where the communications interface 82 is configured to communicate with a network element, the memory 83 is configured to store computer code 831, and the processor 84 executes the computer code 831 to: receive a relocation request sent by a first network device, where the relocation request includes information about a third network device, where the information about the third network device is used for the network device to establish a connection to the third network device; establish the connection to the third network device, and indicate to the third network device that a handover process of user equipment starts, so that the third network device caches data; send a relocation response to the first network device, where the relocation response carries indication information indicating that the data is to be forwarded by using a signaling plane; and receive the data sent by the third network device.

Optionally, the processor 84 executes the computer code 831 to further: before the data sent by the third network device is received, send a handover complete notification to the third network device, so that the third network device updates serving node information from an address of the first network device to an address of the network device.

When an executed handover is an internal handover in an E-UTRAN, the first network device is a source mobility management entity, the network device 8 is a target mobility management entity, the third network device is a machine type communication interworking function MTC-IWF, a source network device is a source base station, and a target network device is a target base station; or when an executed handover is a handover from an E-UTRAN to a UTRAN, the first network device is a source mobility management entity, the network device 8 is a target serving general packet radio service support node SGSN, the third network device is an MTC-IWF, a source network device is a source base station, and a target network device is a target radio network controller RNC; or when an executed handover is a handover from a UTRAN to an E-UTRAN, the first network device is a source SGSN, the network device is a target mobility management entity, the third network device is an MTC-IWF, a source network device is a source RNC, and a target network device is a target base station.

This embodiment of the present application provides a network device. After user equipment triggers a handover process, a first network device sends a relocation request to the network device, then the network device establishes a connection to a third network device indicated by the relocation request, after the network device establishes the connection to the third network device indicated by the relocation request, the third network device caches data, and after a handover of the user equipment is completed, the network device receives the data forwarded by the target network device and forwards the data to the user equipment. This solves an issue that when there is no default bearer in an evolved packet system, small data is forwarded by using a signal connection when user equipment is handed over between cells.

In the several embodiments provided in the present application, it should be understood that the disclosed method and apparatus may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

What is claimed is:

1. A method for a handover without a default bearer, the method comprising:
   sending, by a first network device, a relocation request to a second network device, wherein the relocation request comprises information about a third network device and a forwarding mode identifier, wherein the information about the third network device is used for the second network device to establish a connection to the third network device, and the forwarding mode identifier is used for indicating direct forwarding or indirect forwarding, wherein the first network device forwards data between the third network device and a source network device, and the second network device forwards data for a target network device, and wherein the relocation request is sent in response to a request of a handover from the source network device to the target network device;
   receiving, by the first network device, a relocation response sent by the second network device, wherein the relocation response carries indication information indicating that data is to be forwarded by using a signaling plane;
   sending, by the first network device, a handover command to the source network device, so that the source network device forwards data to the target network device according to a forwarding mode indicated by the forwarding mode identifier carried in the handover command; and
   sending, by the first network device, a relocation complete message to the second network device, so that the second network device sends a handover complete notification message to the third network device, and the third network device updates serving node information from an address of the first network device to an address of the second network device, wherein the target network device communicates with the third network device through the second network device without using a data plane bearer after the handover is completed.

2. The method according to claim 1, wherein the handover is an internal handover in an evolved universal mobile telecommunications system terrestrial radio access network (E-UTRAN) or a handover between the E-UTRAN and a universal mobile telecommunications system terrestrial radio access network (UTRAN), and wherein sending the handover command to the source network device comprises:
   sending, by the first network device, the handover command to the source network device, wherein the forwarding mode identifier carried in the handover command instructs the source network device to directly forward data to the target network device;
   receiving, by the first network device, the data sent by the source network device; and
   forwarding, by the first network device, the data to the second network device by using a signaling plane bearer, so that the second network device sends the data to the target network device.

3. The method according to claim 1, wherein the handover is an internal handover in an evolved universal mobile telecommunications system terrestrial radio access network (E-UTRAN) or a handover between the E-UTRAN and a (universal mobile telecommunications system terrestrial radio access network (UTRAN), and where in sending the handover command to the source network device comprises:
   sending, by the first network device, the handover command to the source network device, wherein the forwarding mode identifier carried in the handover command instructs the source network device to indirectly forward data to the target network device;
   receiving, by the first network device, the data sent by the source network device; and
   forwarding, by the first network device, the data to the second network device by using a signaling plane bearer, so that the second network device sends the data to the target network device.

4. The method according to claim 1, wherein the handover is a handover between an E-UTRAN and a UTRAN, wherein a side of a network before the handover has a default bearer and a side of a network after the handover has no default bearer, and wherein sending the handover command to the source network device comprises:
   sending, by the first network device, the handover command to the source network device, wherein the forwarding mode identifier carried in the handover command instructs the source network device to directly forward data to the target network device;
   receiving, by the first network device, the data sent by the source network device; and
   forwarding, by the first network device, the data to a serving gateway, so that the serving gateway forwards the data to the second network device by using a signaling plane bearer.

5. The method according to claim 1, wherein the handover is a handover between an E-UTRAN and a UTRAN, wherein a side of a network before the handover has a default bearer and a side of a network after the handover has no default bearer, and wherein sending the handover command to the source network device comprises:
sending, by the first network device, the handover command to the source network device, wherein the forwarding mode identifier carried in the handover command instructs the source network device to indirectly forward data;
receiving, by the first network device, the data sent by the source network device; and
forwarding, by the first network device, the data to a serving gateway, so that the serving gateway forwards the data to the second network device by using a signaling plane bearer.

6. The method according to claim 5, wherein the forwarding mode identifier instructs the source network device to indirectly forward the data after the first network device receives the relocation response sent by the second network device, and wherein the method further comprises:
sending, by the first network device, a forwarding channel establishment request to the serving gateway;
receiving, by the first network device, a forwarding channel establishment response sent by the serving gateway; and
establishing, by the first network device, the signaling plane bearer between the serving gateway and the second network device.

7. The method according to claim 1, wherein the handover is an internal handover in an E-UTRAN, the first network device is a source mobility management entity, the second network device is a target mobility management entity, the third network device is a machine type communication interworking function (MTC-IWF), the source network device is a source base station, and the target network device is a target base station.

8. The method according to claim 1, wherein the handover is a handover from an E-UTRAN to an UTRAN, the first network device is a source mobility management entity, the second network device is a target serving general packet radio service support node (SGSN), the third network device is an MTC-IWF, the source network device is a source base station, and the target network device is a target radio network controller (RNC).

9. The method according to claim 8, further comprising a determining method for determining that the handover is the handover between the E-UTRAN and the UTRAN, the determining method comprising:
receiving, by the first network device, a handover request message of the source network device, wherein the handover request message comprises an identifier of the target network device; and
determining, by the first network device according to the identifier of the target network device, that the handover is the handover between the E-UTRAN and the UTRAN.

10. The method according to claim 1, wherein the handover is a handover from a UTRAN to an E-UTRAN, the first network device is a source SGSN, the second network device is a target mobility management entity, the third network device is an MTC-IWF, the source network device is a source RNC, and the target network device is a target base station.

11. The method according to claim 10, further comprising a determining method for determining that the handover is the handover between the E-UTRAN and the UTRAN, the determining method comprising:
receiving, by the first network device, a handover request message of the source network device, wherein the handover request message comprises an identifier of the target network device; and
determining, by the first network device according to the identifier of the target network device, that the handover is the handover between the E-UTRAN and the UTRAN.

12. A network device, comprising:
a communications interface configured to communicate with a network element;
a processor;
a non-transitory computer-readable storage medium storing a program to be executed by the processor, the program including instructions for:
sending a relocation request to a second network device, wherein the relocation request comprises information about a third network device and a forwarding mode identifier, wherein the information about the third network device is used for the second network device to establish a connection to the third network device, and the forwarding mode identifier is used for indicating direct forwarding or indirect forwarding, wherein the first network device forwards data between the third network device and a source network device, and the second network device forwards data for a target network device, and wherein the relocation request is sent in response to a request of a handover that is from the source network device to the target network device;
receiving a relocation response sent by the second network device, wherein the relocation response carries indication information indicating that data is to be forwarded by using a signaling plane;
sending a handover command to a source network device, so that the source network device forwards the data to a target network device according to a forwarding mode indicated by the forwarding mode identifier carried in the handover command; and
sending a relocation complete message to the second network device, so that the second network device sends a handover complete notification message to the third network device, and the third network device updates serving node information from an address of the network device to an address of the second network device, wherein the third network device communicates with the target network device through the second network device without using a data plane bearer after the handover is completed.

13. The network device according to claim 12, wherein the handover is an internal handover in an evolved universal mobile telecommunications system terrestrial radio access network (E-UTRAN) or a handover between the E-UTRAN and a universal mobile telecommunications system terrestrial radio access network (UTRAN), wherein the program includes further instructions for:
sending the handover command to the source network device, wherein the forwarding mode identifier carried in the handover command instructs the source network device to directly forward data to the target network device to indirectly forward the data;
receiving the data sent by the source network device; and
forwarding the data to the second network device by using a signaling plane bearer, so that the second network device sends the data to the target network device.

14. The network device according to claim 12, wherein the handover is a handover between an E-UTRAN and a UTRAN, wherein a side of a network before the handover has a default bearer and a side of a network after the handover has no default bearer, and wherein the program includes further instructions for:
sending the handover command to the source network device, wherein the forwarding mode identifier carried in the handover command instructs the source network device to directly forward data to the target network device or to indirectly forward the data;
receiving the data sent by the source network device; and
forwarding the data to a serving gateway, so that the serving gateway forwards the data to the second network device by using a signaling plane bearer.

15. The network device according to claim 14, wherein the forwarding mode identifier instructs the source network device to indirectly forward the data, and wherein the program includes further instructions for:
after the relocation response sent by the second network device is received, sending a forwarding channel establishment request to the serving gateway;
receiving a forwarding channel establishment response sent by the serving gateway; and
establishing the signaling plane bearer between the serving gateway and the second network device.

16. The network device according to claim 12, wherein the handover is an internal handover in an E-UTRAN, the network device is a source mobility management entity, the second network device is a target mobility management entity, the third network device is a machine type communication interworking function (MTC-IWF), the source network device is a source base station, and the target network device is a target base station; or
the handover is a handover from an E-UTRAN to a UTRAN, the network device is a source mobility management entity, the second network device is a target serving general packet radio service support node (SGSN), the third network device is an MTC-IWF, the source network device is a source base station, and the target network device is a target radio network controller (RNC); or
the handover is a handover from a UTRAN to an E-UTRAN, the network device is a source SGSN, the second network device is a target mobility management entity, the third network device is an MTC-IWF, the source network device is a source RNC, and the target network device is a target base station.

17. The network device according to claim 16, wherein the program includes further instructions for:
receiving a handover request message of the source network device, wherein the handover request message comprises an identifier of the target network device; and
determining, according to the identifier of the target network device, that the handover is the handover between the E-UTRAN and the UTRAN.

18. A network device, comprising:
a communications interface configured to communicate with a network element;
a processor coupled to the communications interface; and
a non-transitory computer-readable storage medium storing a program to be executed by the processor, the program including instructions for:
receiving a relocation request sent by a first network device, wherein the relocation request comprises information about a third network device, wherein the information about the third network device is used for the network device to establish a connection to the third network device;
establishing the connection to the third network device, and indicating to the third network device that a handover of a user equipment starts, so that the third network device caches data for the user equipment, wherein the user equipment is handed over from a source network device to a target network device, and wherein the first network device forwards data between the source network device and the third network device, and the network device forwards data between the target network device and the third network device;
sending a relocation response to the first network device in response to the relocation request sent by the first network device, wherein the relocation response carries indication information indicating that the cached data is to be forwarded by using a signaling plane; and
receiving the cached data for the user equipment from the third network device using the signaling plane without using a data plane bearer after the user equipment is handed over to the target network device.

19. The network device according to claim 18, wherein the program includes further instructions for, before the cached data sent by the third network device is received, sending a handover complete notification to the third network device, so that the third network device updates serving node information from an address of the first network device to an address of the network device.

20. The network device according to claim 18, wherein the handover is an internal handover in an E-UTRAN, the first network device is a source mobility management entity, the network device is a target mobility management entity, the third network device is a machine type communication interworking function (MTC-IWF), the source network device is a source base station, and the target network device is a target base station; or
the handover is a handover from an E-UTRAN to a UTRAN, the first network device is a source mobility management entity, the network device is a target serving general packet radio service support node (SGSN), the third network device is an MTC-IWF, the source network device is a source base station, and the target network device is a target radio network controller (RNC); or
the handover is a handover from a UTRAN to an E-UTRAN, the first network device is a source SGSN, the network device is a target mobility management entity, the third network device is an MTC-IWF, the source network device is a source RNC, and the target network device is a target base station.

* * * * *